United States Patent
Kawamura

(10) Patent No.: US 8,917,454 B2
(45) Date of Patent: Dec. 23, 2014

(54) ZOOM LENS AND IMAGING APPARATUS

(71) Applicant: FUJIFILM Corporation, Tokyo (JP)

(72) Inventor: Daiki Kawamura, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/139,252

(22) Filed: Dec. 23, 2013

(65) Prior Publication Data

US 2014/0111869 A1    Apr. 24, 2014

Related U.S. Application Data

(63) Continuation of application No. PCT/JP2012/004056, filed on Jun. 22, 2012.

(30) Foreign Application Priority Data

Jun. 24, 2011   (JP) .................................. 2011-140024

(51) Int. Cl.
*G02B 15/14* (2006.01)
*G02B 3/02* (2006.01)
*G02B 9/08* (2006.01)

(52) U.S. Cl.
USPC ........... 359/680; 359/682; 359/683; 359/684; 359/691; 359/717; 359/740; 359/793

(58) Field of Classification Search
USPC .......... 359/680, 691, 682–684, 717, 740, 793
See application file for complete search history.

(56) References Cited

U.S. PATENT DOCUMENTS

| | | | | |
|---|---|---|---|---|
| 6,967,783 B2 * | 11/2005 | Noda | ............................ | 359/691 |
| 6,972,908 B2 * | 12/2005 | Noda | ............................ | 359/680 |
| 7,164,538 B1 * | 1/2007 | Noda | ............................ | 359/680 |
| 7,492,527 B2 * | 2/2009 | Tomioka | ....................... | 359/689 |
| 7,542,215 B2 * | 6/2009 | Muratani | ...................... | 359/691 |
| 7,777,965 B2 * | 8/2010 | Eguchi | .......................... | 359/682 |
| 7,830,616 B2 * | 11/2010 | Masugi | .......................... | 359/689 |
| 7,880,976 B2 | 2/2011 | Tashiro | | |

(Continued)

FOREIGN PATENT DOCUMENTS

| | | |
|---|---|---|
| JP | 2004-264638 | 9/2004 |
| JP | 2007-078801 | 3/2007 |

(Continued)

OTHER PUBLICATIONS

International Search Report, PCT/JP2012/004056, Sep. 11, 2012.

*Primary Examiner* — Evelyn A. Lester
(74) *Attorney, Agent, or Firm* — Young & Thompson

(57) ABSTRACT

A zoom lens includes: a first lens group having a negative power; and a second lens group having a positive power, in this order from an object side. The first lens group includes a first lens having a negative power and a second lens having a positive power. The zoom lens satisfies conditional formulae $1.6 < |f1|/fw < 2.5$ (1); $1.6 < f2/fw < 2.4$ (2); $0.32 < d2/fw < 0.60$ (3); $2.5 < ft/fw < 4.5$ (4); $1.56 < nd2 < 1.66$ (5); and $vd2 < 33$ (6), when f1: the focal length of the first lens group, f2: the focal length of the second lens group, fw: the focal length of the entire system at the wide angle end, d2: the distance between the first and second lenses along an optical axis, ft: the focal length of the entire system at the telephoto end, nd2: the refractive index of the second lens at the d line, and vd2: the Abbe's number of the second lens at the d line.

20 Claims, 23 Drawing Sheets

(56) References Cited

U.S. PATENT DOCUMENTS

| | | | |
|---|---|---|---|
| 7,920,334 B2* | 4/2011 | Shimada | 359/689 |
| 2004/0174613 A1 | 9/2004 | Noda | |
| 2005/0134969 A1* | 6/2005 | Shinohara | 359/680 |
| 2005/0207023 A1* | 9/2005 | Suzuki | 359/680 |
| 2006/0077563 A1* | 4/2006 | Mihara et al. | 359/680 |
| 2006/0176575 A1* | 8/2006 | Katakura | 359/680 |
| 2007/0103791 A1* | 5/2007 | Hankawa et al. | 359/680 |
| 2007/0121217 A1* | 5/2007 | Hozumi et al. | 359/680 |
| 2009/0097131 A1* | 4/2009 | Iijima | 359/684 |
| 2009/0296233 A1 | 12/2009 | Tashiro | |
| 2010/0284093 A1* | 11/2010 | Tashiro | 359/691 |
| 2014/0092485 A1* | 4/2014 | Kawamura | 359/691 |
| 2014/0111870 A1* | 4/2014 | Kawamura | 359/684 |

FOREIGN PATENT DOCUMENTS

| | | |
|---|---|---|
| JP | 2007-108399 | 4/2007 |
| JP | 2007-187740 | 7/2007 |
| JP | 2007-293368 | 11/2007 |
| JP | 2008-112000 | 5/2008 |
| JP | 2009-294303 | 12/2009 |
| JP | 2010-224580 | 10/2010 |
| JP | 2012-103416 | 5/2012 |

* cited by examiner

FIG.1
EXAMPLE 1
A WIDE ANGLE END
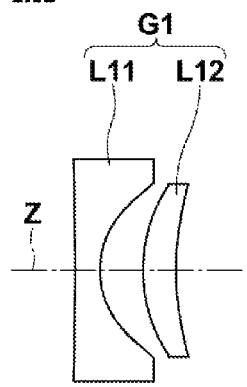
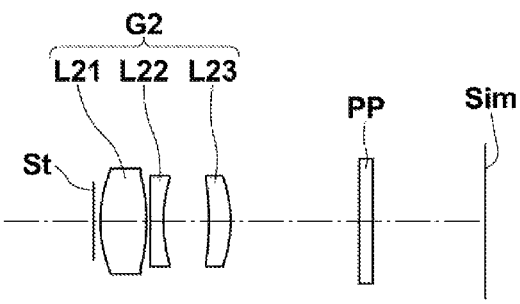
B TELEPHOTO END
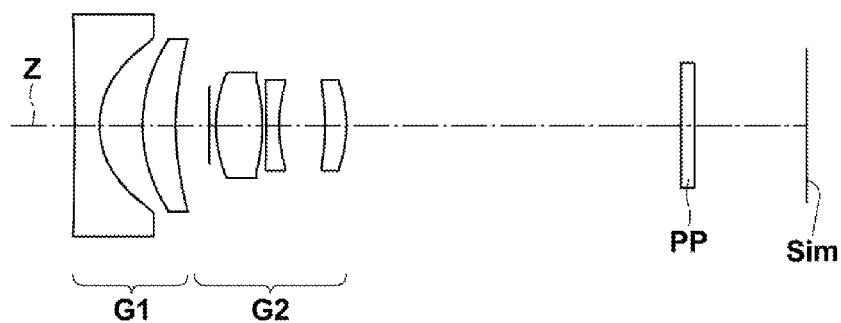

FIG.2
EXAMPLE 2
A WIDE ANGLE END
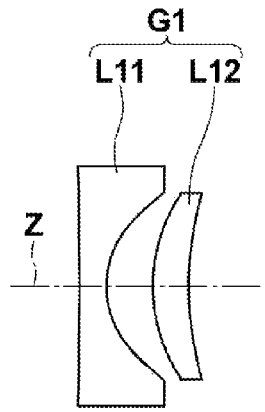
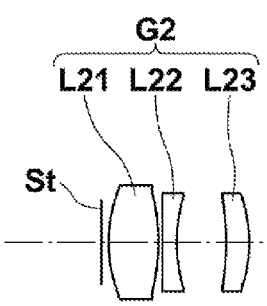
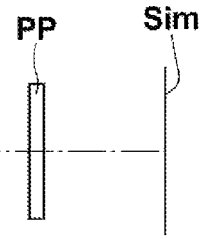
B TELEPHOTO END
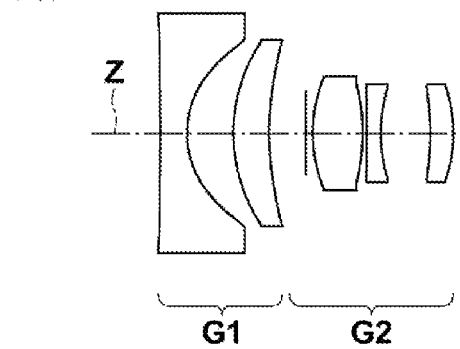
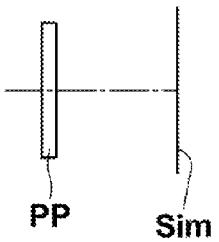

FIG.3
EXAMPLE 3
A
WIDE ANGLE END
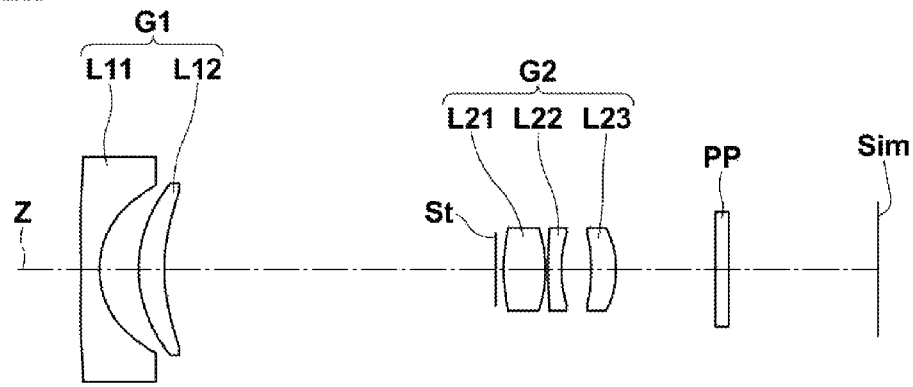
B
TELEPHOTO END
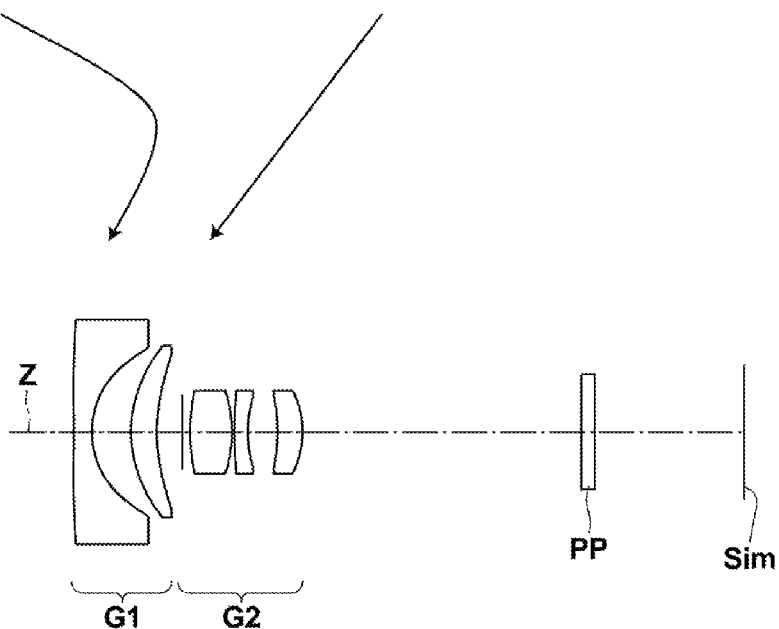

FIG.4
A
WIDE ANGLE END
EXAMPLE 4
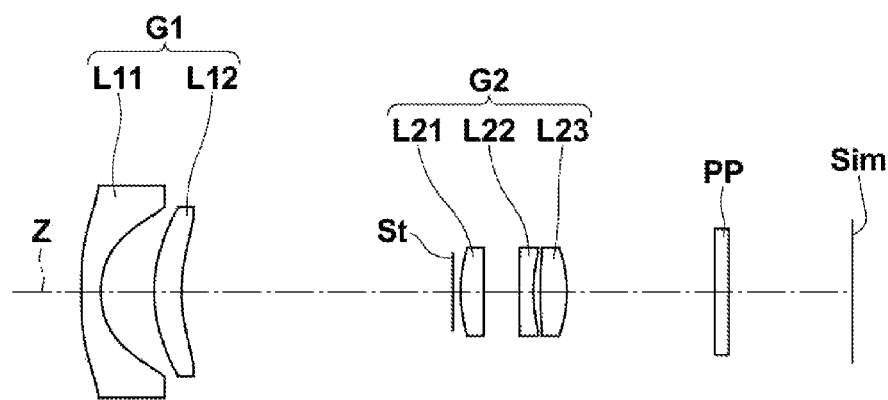
B
TELEPHOTO END
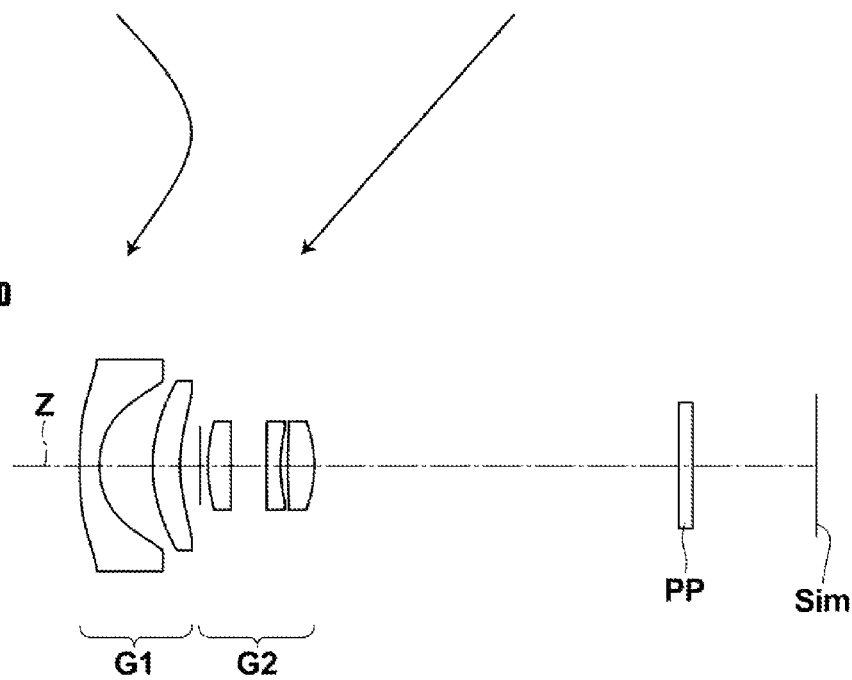

FIG.5
EXAMPLE 5
A WIDE ANGLE END
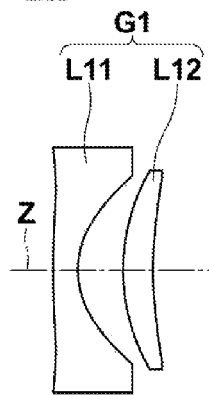
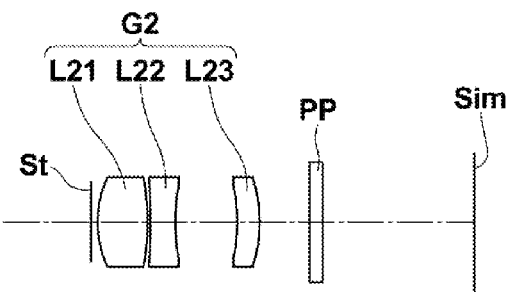
B TELEPHOTO END
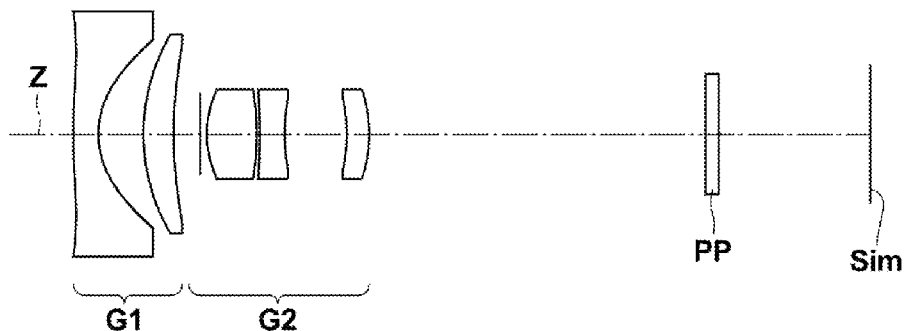

FIG.6
EXAMPLE 6
A
WIDE ANGLE END
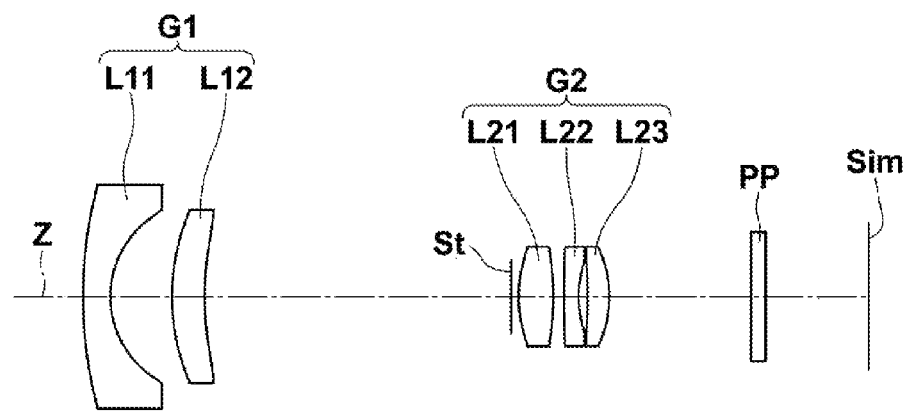
B
TELEPHOTO END
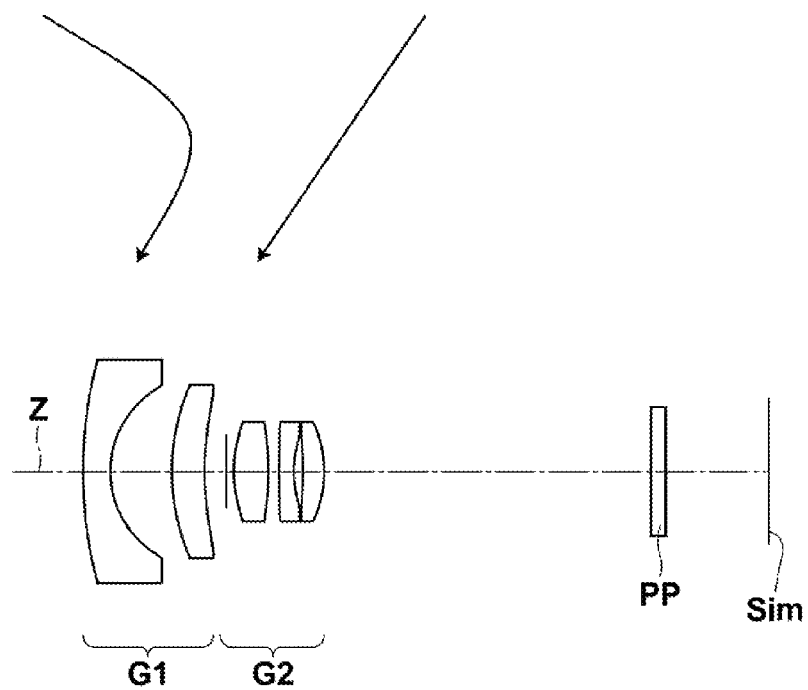

FIG.7
A
WIDE ANGLE END
EXAMPLE 7
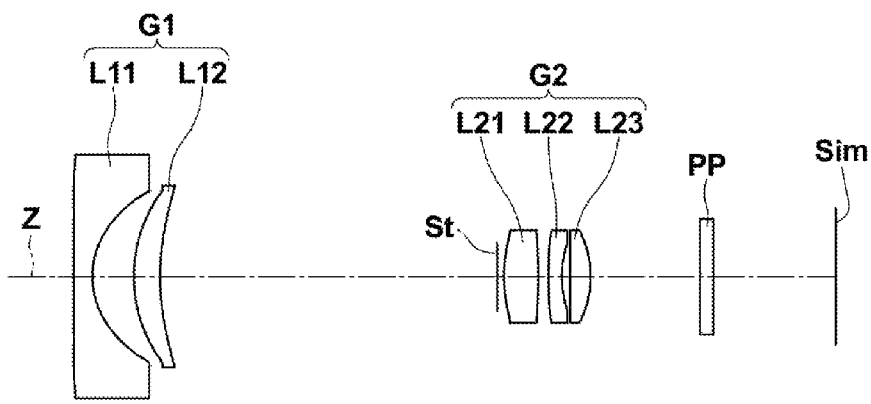
B
TELEPHOTO END
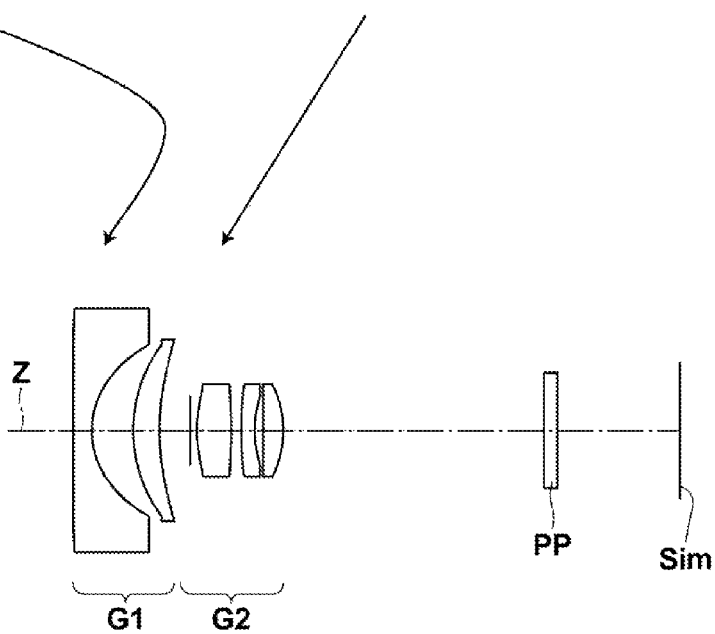

FIG.8
A
WIDE ANGLE END
EXAMPLE 8
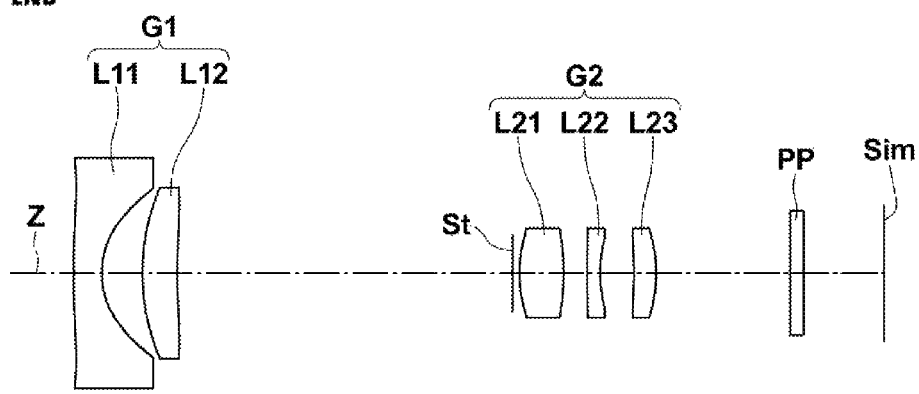
B
TELEPHOTO END
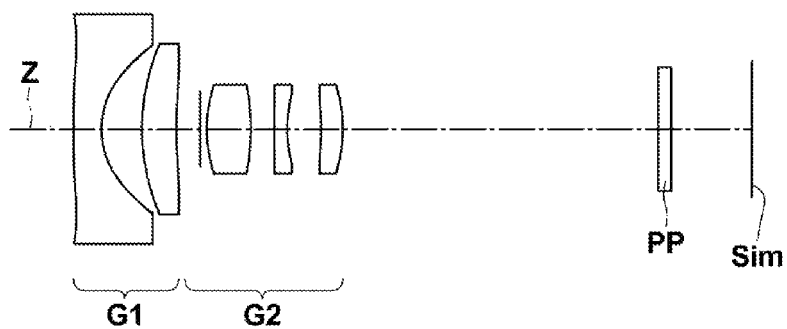

FIG.9
EXAMPLE 9
A
WIDE ANGLE END
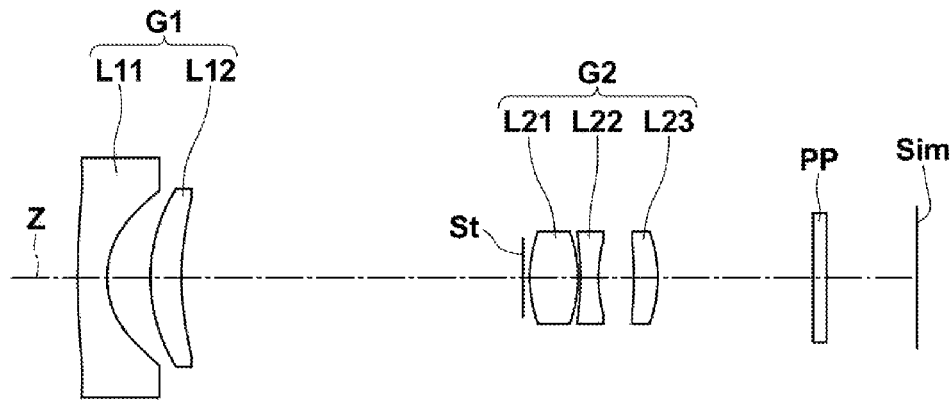
B
TELEPHOTO END
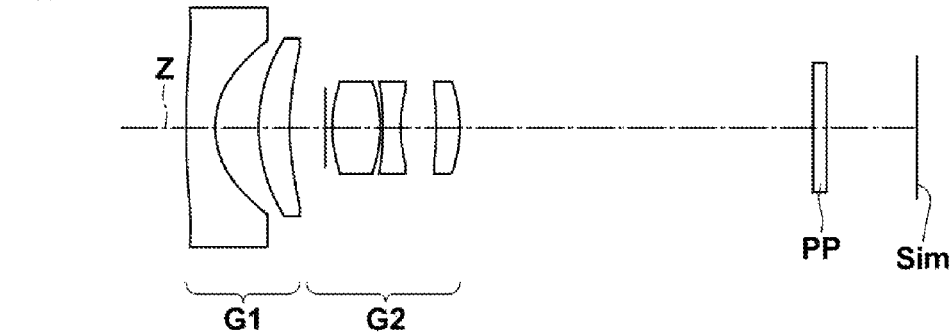

FIG.10
EXAMPLE 10
A
WIDE ANGLE END
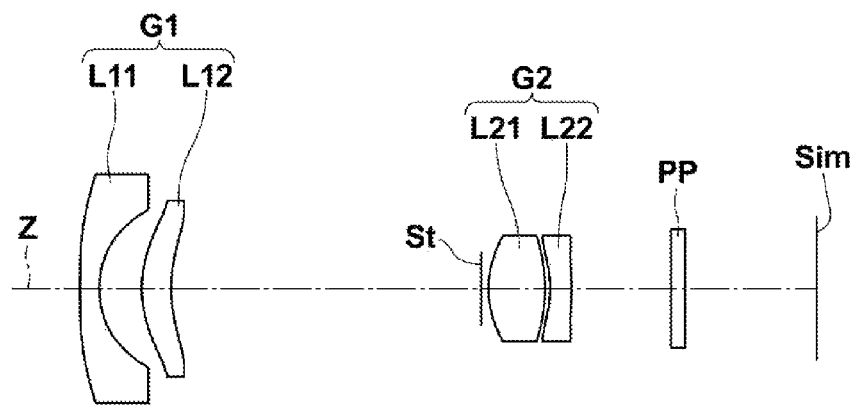
B
TELEPHOTO END
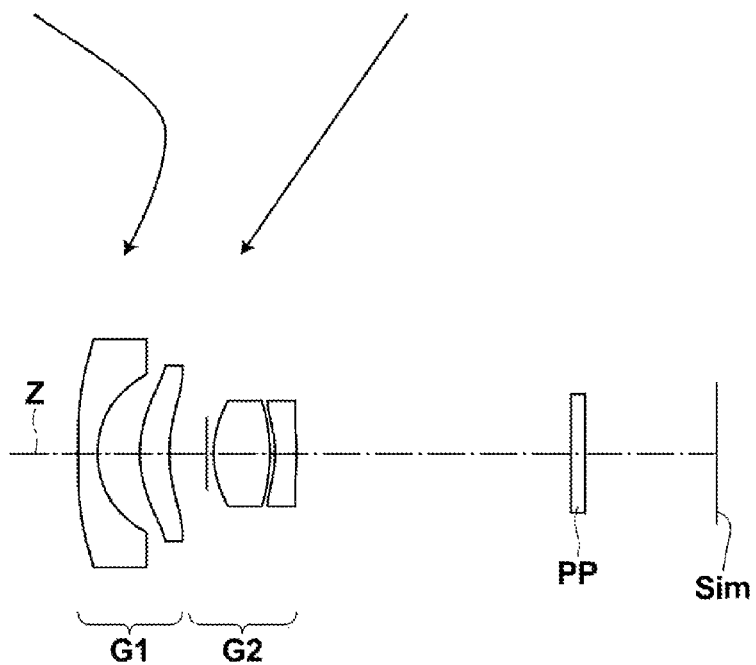

FIG.11
A
WIDE ANGLE END
EXAMPLE 11
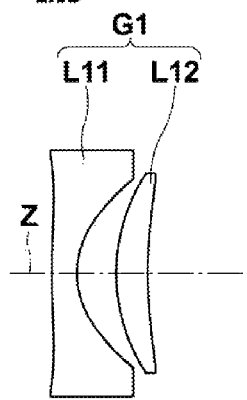
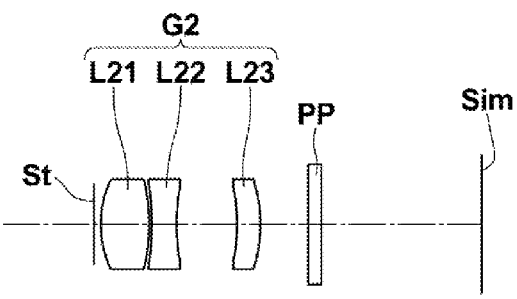
B
TELEPHOTO END
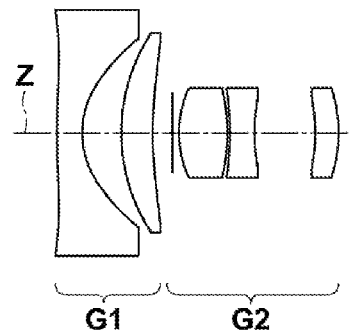

FIG.14 EXAMPLE 3

ZOOM LENS AND IMAGING APPARATUS

CROSS REFERENCE TO RELATED APPLICATIONS

This application is a continuation of PCT/JP2012/004056 filed on Jun. 22, 2012, which claims foreign priority to Japanese Application No. 2011-140024 filed on Jun. 24, 2011. The entire contents of each of the above applications are hereby incorporated by reference.

TECHNICAL FIELD

The present invention is related to a zoom lens and an imaging apparatus. Particularly, the present invention is related to a zoom lens which can be favorably utilized in miniature cameras and portable terminal devices, and to an imaging apparatus equipped with such a zoom lens.

BACKGROUND ART

Conventionally, zoom lenses of the two group or the three group type having leading negative lens groups (a configuration in which negative lens groups are provided toward the object side) are well known as zoom lenses to be provided in compact digital cameras, compact video cameras, and portable terminal devices. For example, Japanese Unexamined Patent Publication No. 2007-293368 and Japanese Unexamined Patent Publication No. 2007-108399 disclose examples of simpler low cost two group type zoom lenses having variable magnification ratios of approximately 3×, in which a first lens group is constituted by two lenses, and a second lens group is constituted by three lenses, for a total of five lenses. Japanese Unexamined Patent Publication No. 2007-078801 discloses a zoom lens in which a first lens group is constituted by 2 lenses and a second lens group is constituted by two lenses, for a total of 4 lenses.

Meanwhile, Japanese Unexamined Patent Publication No. 2008-112000 and Japanese Unexamined Patent Publication No. 2007-187740 disclose a zoom lens in which plastic lenses are employed and a zoom lens which is designed presuming that plastic lenses may be employed. Japanese Unexamined Patent Publication No. 2008-112000 discloses an example in which one of three lenses that constitute a first lens group is a plastic lens. In addition, Japanese Unexamined Patent Publication No. 2007-187740 discloses an example in which all lenses are plastic lenses.

DISCLOSURE OF THE INVENTION

The zoom lens disclosed in Japanese Unexamined Patent Publication No. 2007-078801 is constituted by an extremely small number of lenses. However, cost reduction cannot be realized simply by reducing the number of lenses. For example, if a zoom lens is constituted by a small number of lenses, the power of each lens will become great, resulting in tolerances for production error and assembly error becoming small, processing of the lenses becoming difficult, etc. As a result, there is a possibility that production costs will increase.

Forming lenses with less expensive materials, for example, plastic materials, is a means for reducing costs. However, if a zoom lens is constituted by a small number of lenses, the power of each lens will become great. Therefore, it will become difficult to employ less expensive plastic materials. This is because variations in optical data and performance accompanying temperature changes will become great, and correction balance of aberrations will become difficult. Here, if the configuration of the zoom lens disclosed in Japanese Unexamined Patent Publication No. 2007-078801 is reconsidered, it can be understood that this zoom lens was not designed with a focus on cost reduction but rather to decrease the thickness when retracted, because materials having high refractive indices are employed for both the positive lens and the negative lens of the first lens group.

From an opposite viewpoint, in the case that optical performance and cost is prioritized over size, it may be considered that the configuration of the second lens group disclosed in Japanese Unexamined Patent Publication No. 2007-293368 and Japanese Unexamined Patent Publication No. 2007-108399 is preferable to the configuration of the second lens group disclosed in Japanese Unexamined Patent Publication No. 2007-078801, in which the power of the positive lens group is distributed between two lenses. In addition, the power of each positive lens of the second lens group will become smaller by adopting this configuration, and it will be possible to employ lenses formed by plastic. However, the lenses of the first lens group of the zoom lenses of Japanese Unexamined Patent Publication No. 2007-293368 and Japanese Unexamined Patent Publication No. 2007-108399 are formed by materials having high refractive indices, and there remains room for further cost reduction.

As described above, it is necessary to optimally set the power of each lens in order to employ plastic lenses. That is, the power distribution to each lens must be sufficiently considered in the case that a zoom lens is constituted by a small number of lenses as disclosed in Japanese Unexamined Patent Publication No. 2007-078801 and low cost plastic lenses are to be employed.

Japanese Unexamined Patent Publication No. 2008-112000 and Japanese Unexamined Patent Publication No. 2007-187740 disclose examples of zoom lenses that employ plastic lenses. However, the first lens groups of these zoom lenses have one more lens than the first lens groups of the zoom lenses disclosed in Patent Japanese Unexamined Patent Publication No. 2007-293368, Japanese Unexamined Patent Publication No. 2007-108399, and Japanese Unexamined Patent Publication No. 2007-078801. Distributing power of a single high power lens into two lenses to reduce the power of each lens to employ lenses, of which the power has been reduced to a certain degree, is an approach in the case that plastic lenses are employed. However, if such a configuration is adopted, the retraction length will become great. In addition, Japanese Unexamined Patent Publication No. 2007-187740 discloses an example of a zoom lens in which all of the lenses are plastic lenses. In this case, however, the variable magnification ratio is only approximately 2×.

The present invention has been developed in view of the foregoing circumstances. It is an object of the present invention to provide a two lens group zoom lens that can secure a variable magnification ratio of 3× to 4× with a small number of lenses, that can achieve cost reduction by being capable of employing plastic lenses, and that can realize favorable optical performance by optimally setting the power of each lens.

A first zoom lens of the present invention practically comprises:

a first lens group having a negative refractive power; and
a second lens group having a positive refractive power, provided in this order from an object side;
the first lens group moving along a trajectory which is convex toward an image side, the second lens group moving monotonously toward the object side, and an aperture stop moving integrally with the second lens group when changing magnification from a wide angle end to a telephoto end;

the first lens group comprising two lenses, a first lens having a negative refractive power and a second lens having a positive refractive power;

at least one of the two lenses of the first lens group being a plastic lens;

the second lens group comprising three or fewer lenses, of which at least one is a plastic lens; and the zoom lens satisfying the following conditional formulae:

$$1.6<|f1|/fw<2.5 \quad (1)$$

$$1.6<f2/fw<2.4 \quad (2)$$

$$0.32<d2/fw<0.60 \quad (3)$$

$$2.5<ft/fw<4.5 \quad (4)$$

$$1.56<nd2<1.66 \quad (5)$$

$$vd2<33 \quad (6)$$

wherein f1 is the focal length of the first lens group, f2 is the focal length of the second lens group, fw is the focal length of the entire system at the wide angle end, d2 is the distance between the first lens and the second lens along an optical axis, ft is the focal length of the entire system at the telephoto end, nd2 is the refractive index of the second lens with respect to the d line, and vd2 is the Abbe's number of the second lens with respect to the d line.

Here, the expression "practically comprises a first lens group . . . and a second lens group" means that the zoom lens may also include lenses that practically have any power, optical elements other than lenses such as aperture stops and cover glass, and mechanical components such as lens flanges, a lens barrel, an imaging element, a blur correcting mechanism, etc.

Note that the "second lens group" of the zoom lens of the present invention is not necessarily constituted by a plurality of lenses, and may be constituted by a single lens. In addition, cemented lenses may be employed as the lenses that constitute each lens group. In the case that cemented lenses are employed, they will be counted as n lenses if they are constituted by n lenses cemented together. In addition, the expressions "zoom lens of the present invention" and "zoom lens according to the present invention" in the present specification refer to both the first zoom lens of the present invention and the second zoom lens of the present invention, unless particularly noted.

The surface shapes and the signs of refractive powers of the lenses of the zoom lens of the present invention will be those in the paraxial regions for lenses that include aspherical surfaces.

It is desirable for the first zoom lens of the present invention to satisfy the following conditional formulae:

$$1.48<nd1<1.61 \quad (7)$$

$$vd1>50 \quad (8)$$

wherein nd1 is the refractive index of the first lens with respect to the d line, and vd1 is the Abbe's number of the first lens with respect to the d line.

A second zoom lens according to the present invention practically comprises:

a first lens group having a negative refractive power; and a second lens group having a positive refractive power, provided in this order from an object side;

the first lens group moving along a trajectory which is convex toward an image side, the second lens group moving monotonously toward the object side, and an aperture stop moving integrally with the second lens group when changing magnification from a wide angle end to a telephoto end;

the first lens group comprising two lenses, a first lens having a negative refractive power and a second lens having a positive refractive power;

at least one of the two lenses of the first lens group being a plastic lens;

the second lens group comprising three or fewer lenses, of which at least one is a plastic lens; and the zoom lens satisfying the following conditional formulae:

$$1.6<|f1|/fw<2.5 \quad (1)$$

$$1.6<f2/fw<2.4 \quad (2)$$

$$0.32<d2/fw<0.60 \quad (3)$$

$$2.5<ft/fw<4.5 \quad (4)$$

$$1.48<nd1<1.61 \quad (7)$$

$$vd1>50 \quad (8)$$

wherein f1 is the focal length of the first lens group, f2 is the focal length of the second lens group, fw is the focal length of the entire system at the wide angle end, d2 is the distance between the first lens and the second lens along an optical axis, ft is the focal length of the entire system at the telephoto end, nd1 is the refractive index of the first lens with respect to the d line, and vd1 is the Abbe's number of the first lens with respect to the d line.

It is preferable for the zoom lens of the present invention to satisfy the following conditional formula:

$$5.8<TLw/fw<8.4 \quad (9)$$

wherein TLw is the distance from the surface of the first lens toward the object side to an imaging surface along the optical axis at the wide angle end, and fw is the focal length of the entire system at the wide angle end.

It is desirable for the second lens to be a plastic lens in the zoom lens of the present invention.

Further, it is desirable for the first lens to also be a plastic lens in the zoom lens of the present invention.

In the zoom lens of the present invention, it is desirable for the second lens group to comprise a third lens having a positive refractive power, a fourth lens having a negative refractive power, and a fifth lens having a positive refractive power, in this order from the object side.

It is desirable for all of the lenses that constitute the second lens group to be plastic lenses in the zoom lens of the present invention.

It is desirable for the zoom lens of the present invention to satisfy the following conditional formula:

$$0.7<D1/fw<1.2 \quad (10)$$

wherein D1 is the distance from the surface of the first lens toward the object side to the surface of the first lens toward the image side, and fw is the focal length of the entire system at the wide angle end.

It is desirable for the surface of the first lens of the first lens group toward the object side to be concave in a paraxial region in the zoom lens of the present invention.

In the zoom lens of the present invention, more preferable ranges for the conditions expressed by conditional formulae (2), (3), (4), (5), (6), (8), (9), and (10) are as follows:

$$1.7 < f2/fw < 2.3 \quad (2')$$

$$0.32 < d2/fw < 0.55 \quad (3')$$

$$2.7 < ft/fw < 4.5 \quad (4')$$

$$1.56 < nd2 < 1.65 \quad (5')$$

$$vd2 > 29 \quad (6')$$

$$vd1 > 52 \quad (8')$$

$$6.0 < TLw/fw < 8.2 \quad (9')$$

$$0.8 < D1/fw < 1.1 \quad (10').$$

In the zoom lens of the present invention, it is preferable for both of the two lenses that constitute the first lens group to be plastic lenses.

In the zoom lens of the present invention, it is desirable for the second lens group to comprise a third lens having a positive refractive power, a fourth lens having a negative refractive power, and a fifth lens having a positive refractive power, in this order from the object side. It is desirable for the third lens to satisfy the following conditional formulae:

$$1.48 < nd3 < 1.61 \quad (11)$$

$$vd3 > 50 \quad (12)$$

and more preferably:

$$vd3 > 52 \quad (12')$$

wherein nd3 is the refractive index of the third lens with respect to the d line and vd3 is the Abbe's number of the third lens with respect to the d line. It is desirable for the fourth lens to satisfy the following conditional formulae:

$$1.56 < nd4 < 1.68 \quad (13)$$

$$vd4 < 33 \quad (14)$$

and more preferably:

$$vd4 < 29 \quad (14')$$

wherein nd4 is the refractive index of the fourth lens with respect to the d line and vd4 is the Abbe's number of the fourth lens with respect to the d line. It is desirable for the fifth lens to satisfy the following conditional formulae:

$$1.48 < nd5 < 1.61 \quad (15)$$

$$vd5 < 50 \quad (16)$$

and more preferably:

$$vd5 > 52 \quad (16')$$

wherein nd5 is the refractive index of the fifth lens with respect to the d line and vd5 is the Abbe's number of the fifth lens with respect to the d line.

One or one through five of the above conditional formulae (11), (12), (13), (14), (15), and (16) may be satisfied.

Note that in the zoom lens of the present invention, all of the lenses may be plastic lenses, by setting the powers of the lenses appropriately, taking variations in optical properties and the like due to temperature changes sufficiently into consideration.

Further, it is preferable for the zoom lens of the present invention to satisfy the following conditional formula:

$$8° < \alpha w < 12° \quad (17)$$

and more preferably $$9° < \alpha w < 11° \quad (17')$$

wherein αw is the emission angle (an angle with respect to a line normal to an imaging plane) of a principal ray of a most exterior angle light beam when an object at infinity is focused on at the wide angle end.

In the zoom lens of the present invention, it is preferable for a configuration to be adopted, wherein the entirety of the second lens group or a portion of the lenses of the second lens group is moved along the optical axis when focusing from infinity to a near distance. More specifically, when the second lens group is constituted by the third lens having a positive refractive power, the fourth lens having a negative refractive power, and the fifth lens having a positive refractive power, in this order from the object side, it is preferable for only the fifth lens to be moved along the optical axis.

Meanwhile, the imaging apparatus of the present invention is characterized by being equipped with the first or the second zoom lens of the present invention described above.

The zoom lens according to the present invention practically comprises: the first lens group having a negative refractive power; and the second lens group having a positive refractive power, provided in this order from an object side; the first lens group moving along a trajectory which is convex toward an image side, the second lens group moving monotonously toward the object side, and an aperture stop moving integrally with the second lens group when changing magnification from a wide angle end to a telephoto end; the first lens group comprising two lenses, a first lens having a negative refractive power and a second lens having a positive refractive power; at least one of the two lenses of the first lens group being a plastic lens; the second lens group comprising three or fewer lenses, of which at least one is a plastic lens; and the zoom lens satisfying the aforementioned conditional formulae (1) through (6) (in the case of the first zoom lens) or the aforementioned conditional formulae (1) through (4), (7), and (8) (in the case of the second zoom lens) when f1 is the focal length of the first lens group, f2 is the focal length of the second lens group, fw is the focal length of the entire system at the wide angle end, d2 is the distance between the first lens and the second lens along an optical axis, ft is the focal length of the entire system at the telephoto end, nd2 is the refractive index of the second lens with respect to the d line, and vd2 is the Abbe's number of the second lens with respect to the d line. Therefore, cost reduction can be achieved by the use of plastic lenses, and favorable optical performance can be realized while securing a variable magnification ratio of approximately 3× to 4× with a small number of lenses, by setting the power of each lens optimally.

Hereinafter, the aforementioned advantageous effects will be described in greater detail. Conditional Formula (1) determines the relationship between the focal length of the first lens group and the focal length of the entire system at the wide angle end. If the value of |f1|/fw is less than or equal to the lower limit defined in Conditional Formula (1), the power of each lens that constitutes the first lens group becomes great and the power of the lenses that constitute the second lens group also becomes great when chromatic aberration is to be suppressed, and it becomes extremely difficult to balance various aberrations. Particularly, correction of field curvature and distortion will become difficult. Further, the amount of tolerance for production error and assembly error of the lenses that constitute the first lens group will become small, which is not preferable. In addition, when employing plastic lenses within the first lens group, if the power of the lenses is excessively great, variations in imaging plane positions will occur accompanying changes in refractive indices due to temperature, which is not favorable. Inversely, if the value of |f1|/fw is greater than or equal to the upper limit defined in Conditional Formula (1), the amount of movement of the first lens group when changing magnification will become great and the entire length of the optical system will become great, which is not preferable. The above shortcomings can be prevented in the case that Conditional Formula (1) is satisfied.

Conditional Formula (2) determines the relationship between the focal length of the second lens group and the focal length of the entire system at the wide angle end. If the value of f2/fw is less than or equal to the lower limit defined in Conditional Formula (2), the power of each lens that constitutes the second lens group becomes great, and correction of spherical aberration will become difficult. Further, the amount of tolerance for production error and assembly error of the lenses that constitute the second lens group will become small, which is not preferable. In addition, when employing plastic lenses within the second lens group, if the power of the lenses is excessively great, variations in imaging plane positions will occur accompanying changes in refractive indices due to temperature, which is not favorable. Inversely, if the value of f2/fw is greater than or equal to the upper limit defined in Conditional Formula (2), the amount of movement of the second lens group when changing magnification will become great and the lens system as a whole will become excessively large, which is not preferable. The above shortcomings can be prevented in the case that Conditional Formula (2) is satisfied.

Conditional Formula (3) determines the relationship between the distance between the first lens and the second lens of the first lens group and the focal length of the entire system at the wide angle end. If the value of d2/fw is less than or equal to the lower limit defined in Conditional Formula (3), such a small distance is advantageous from the viewpoint of miniaturization, but is not preferable because correction of spherical aberration will become difficult. Inversely, if the value of d2/fw is greater than or equal to the upper limit defined in Conditional formula (3), the first lens group will become large as a whole, which is not preferable. The above shortcomings can be prevented in the case that Conditional Formula (3) is satisfied. In the zoom lens of the present invention, at least one of the lenses of the first lens group is a plastic lens. It is preferable for the value of d2/fw to be within the range defined in Conditional Formula (3) also from the viewpoint of the shape of the flange of the plastic lens and the method by which the first lens and the second lens are to be held.

Conditional Formula (4) determines the relationship between the focal lengths at the wide angle end and the telephoto end, that is, the variable magnification ratio. If the value of ft/fw is less than or equal to the lower limit defined in Conditional Formula (4), the significance of the zoom lens will decrease. Inversely, if the value of ft/fw is greater than or equal to the upper limit defined in Conditional Formula (4), the lens system will become large. In addition, in this type of zoom, decrease in brightness at the telephoto end will become excessive, which is not preferable. If a certain degree of brightness is to be secured at the telephoto end, the burden on the second lens group becomes great, and correction of aberrations with a small number of lenses will become difficult. The above shortcomings can be prevented in the case that Conditional Formula (4) is satisfied.

Conditional Formula (5) and Conditional Formula (7) determine the refractive index of the second lens and the refractive index of the first lens, respectively. If the values of nd2 and nd1 become less than the lower limits defined in Conditional Formulae (5) and (7), the occurrence of aberrations will become great. In addition, the radii of curvature (approximate radii of curvature) of the lenses will become great, resulting in the first lens group becoming thick, which is not preferable. In addition, if at least one of the two lenses of the first lens group is a plastic lens for the purpose of reducing cost and reducing weight, if materials of which the aforementioned values exceed the upper limits of the Conditional Formulae (5) and (7) are employed, it will become difficult to balance correction of astigmatic aberrations and lateral chromatic aberrations, which is not preferable. The above shortcomings can be prevented in the case that Conditional Formula (5) or Conditional Formula (7) is satisfied.

Conditional Formula (6) and Conditional Formula (8) determine the Abbe's number of the second lens and the Abbe's number of the first lens, respectively. If the values of vd2 and vd1 become outside the ranges defined in Conditional Formulae (6) and (8), the difference between the Abbe's numbers of the first lens and the second lens will become small, and correction of chromatic aberrations will become difficult. In addition, if the values of vd2 and vd1 become outside the ranges defined in Conditional Formula (6) or Conditional Formula (8), it will be necessary to increase the power of the other of the two lenses of the first lens group (in the case that the Abbe's number of the second lens is determined by Conditional Formula (6), the first lens will be the "other" lens, and in the case that the Abbe's number of the first lens is determined by Conditional Formula (8), the second lens will be the "other" lens) in order to correct chromatic aberrations. Particularly, correction of field curvature and distortion will become difficult, which is not preferable. The above shortcomings can be prevented in the case that Conditional Formula (6) or Conditional Formula (8) is satisfied.

The above advantageous effects will become more prominent particularly if Conditional Formulae (2'), (4'), (5'), (6'), and (8') are satisfied within the ranges defined in Conditional Formulae (2), (4), (5), (6), and (8).

Meanwhile, if the zoom lens of the present invention satisfies Conditional Formula (9), the advantageous effects described below can be obtained. That is, Conditional Formula (9) determines the relationship between the entire optical length and the focal length at the wide angle end. If the value of TLw/fw is less than or equal to the lower limit defined in Conditional Formula (9), the zoom lens can be configured to be compact. However, the power of each lens will become great, resulting in correction of aberrations becoming difficult. In addition, the tolerances of production error and assembly error will become small, which is not preferable. The above shortcomings can be prevented in the case that Conditional Formula (9) is satisfied.

The above advantageous effects will become more prominent particularly if Conditional Formula (9') is satisfied within the range defined in Conditional Formula (9).

In the case that the zoom lens of the present invention satisfies Conditional Formula (10), the advantageous effects described below can be obtained. That is, it is advantageous for the value of D1/fw to be less than the lower limit defined in Conditional Formula (10) from the viewpoint of miniaturization. However, in order for the zoom lens to be miniaturized by decreasing the value of D1/fw in Conditional Formula

(10) after a predetermined spatial interval between the first lens and the second lens is secured as determined by Conditional Formula (3), it is necessary for the first lens and the second lens to be formed small or thin. It will become difficult to correct distortion and to balance correction of chromatic aberrations using such lenses, which is not preferable. In addition, difficulties will arise in employing plastic as the material of the lenses of the first lens group. Inversely, if the value of D1/fw is greater than or equal to the upper limit defined in Conditional Formula (10), the first lens group will become large, which is not preferable. The above shortcomings can be prevented in the case that Conditional Formula (10) is satisfied.

The above advantageous effects will become more prominent particularly if Conditional Formula (10') is satisfied within the range defined in Conditional Formula (10).

In the zoom lens of the present invention, in the case that the two lenses that constitute the first lens group are both plastic lenses, the advantageous effects described below can be obtained. That is, the first lens group is constituted by one negative lens and one positive lens. Therefore, in the case that at least one plastic lens is employed in the first lens group and imaging plane variations accompanying temperature changes are considered, if both of the lenses are plastic lenses, it is advantageous in that the powers of the lenses will cancel each other out. In addition, it is preferable for aspherical lenses to be employed in the first lens group in order to obtain favorable optical performance. If both of the two lenses that constitute the first lens group are plastic lenses, costs can be reduced compared to a case in which aspherical lenses are formed from glass.

In the zoom lens of the present invention, particularly in the case that the second lens group comprises a third lens having a positive refractive power, a fourth lens having a negative refractive power, and a fifth lens having a positive refractive power, in this order from the object side, and the lenses satisfy Conditional Formulae (11), (12), 13), (14), (15), and (16), the advantageous effects described below can be obtained. That is, in the second lens group that includes at least one plastic lens, if the positive lens is to be formed by a plastic material, it is preferable for a material having an Abbe's number of approximately 55 to be employed, and if the negative lens is to be formed by a plastic material, it is preferable for a material having an Abbe's number of approximately 25 to be employed. If the other lenses are formed by materials that satisfy Conditional Formulae (11) through (16), field curvature and spherical aberration can be corrected with favorable balance.

Further, the lenses that constitute the second lens group can be formed by comparatively inexpensive glass or plastics, by Conditional Formulae (11) through (16) being satisfied.

The above advantageous effects will become more prominent particularly if Conditional Formulae (12'), (14'), and (16') are satisfied within the ranges defined in Conditional Formulae (12), (14), and (16).

In the zoom lens of the present invention, in the case that conditional formula (17) is satisfied when αw is the emission angle (an angle with respect to a line normal to an imaging plane) of a principal ray of a most exterior angle light beam when an object at infinity is focused on at the wide angle end, decreases in peripheral light intensity at an imaging element can be prevented. This advantageous effect will become more prominent if Conditional Formula (17') is satisfied instead of Conditional Formula (17).

In the zoom lens of the present invention, in the case that a configuration is adopted, wherein the entirety of the second lens group or a portion of the lenses of the second lens group is moved along the optical axis when focusing from infinity to a near distance, the following advantageous effects can be obtained. That is, in the case that a configuration in which the entirety of the first lens group is moved forward to focus, the effective diameter of the first lens group will become large and it will become necessary to move lenses having large outer diameters. However, such problems can be avoided in the case that the entirety of the second lens group or a portion of the lenses of the second lens group are moved to focus.

The above advantageous effect becomes more prominent in the case that a configuration is adopted, in which the second lens group comprises the third lens having a positive refractive power, the fourth lens having a negative refractive power, and the fifth lens having a positive refractive power, and only the fifth lens is moved along the optical axis.

In the zoom lens of the present invention, if the surface toward the object side of the first lens of the first lens group is concave in the paraxial region, longitudinal chromatic aberration and lateral chromatic aberration can be corrected with favorable balance.

Meanwhile, the imaging apparatus according to the present invention is equipped with the zoom lens of the present invention that exhibits the advantageous effects described above. Therefore, the imaging apparatus of the present invention can achieve cost reduction while maintaining favorable optical performance.

BRIEF DESCRIPTION OF THE DRAWINGS

FIG. 1 is a cross sectional diagram that illustrates the lens configuration of a zoom lens according to a first embodiment of the present invention.

FIG. 2 is a cross sectional diagram that illustrates the lens configuration of a zoom lens according to a second embodiment of the present invention.

FIG. 3 is a cross sectional diagram that illustrates the lens configuration of a zoom lens according to a third embodiment of the present invention.

FIG. 4 is a cross sectional diagram that illustrates the lens configuration of a zoom lens according to a fourth embodiment of the present invention.

FIG. 5 is a cross sectional diagram that illustrates the lens configuration of a zoom lens according to a fifth embodiment of the present invention.

FIG. 6 is a cross sectional diagram that illustrates the lens configuration of a zoom lens according to a sixth embodiment of the present invention.

FIG. 7 is a cross sectional diagram that illustrates the lens configuration of a zoom lens according to a seventh embodiment of the present invention.

FIG. 8 is a cross sectional diagram that illustrates the lens configuration of a zoom lens according to an eighth embodiment of the present invention.

FIG. 9 is a cross sectional diagram that illustrates the lens configuration of a zoom lens according to a ninth embodiment of the present invention.

FIG. 10 is a cross sectional diagram that illustrates the lens configuration of a zoom lens according to a tenth embodiment of the present invention.

FIG. 11 is a cross sectional diagram that illustrates the lens configuration of a zoom lens according to an eleventh embodiment of the present invention.

BEST MODE FOR CARRYING OUT THE INVENTION

Figure 12:
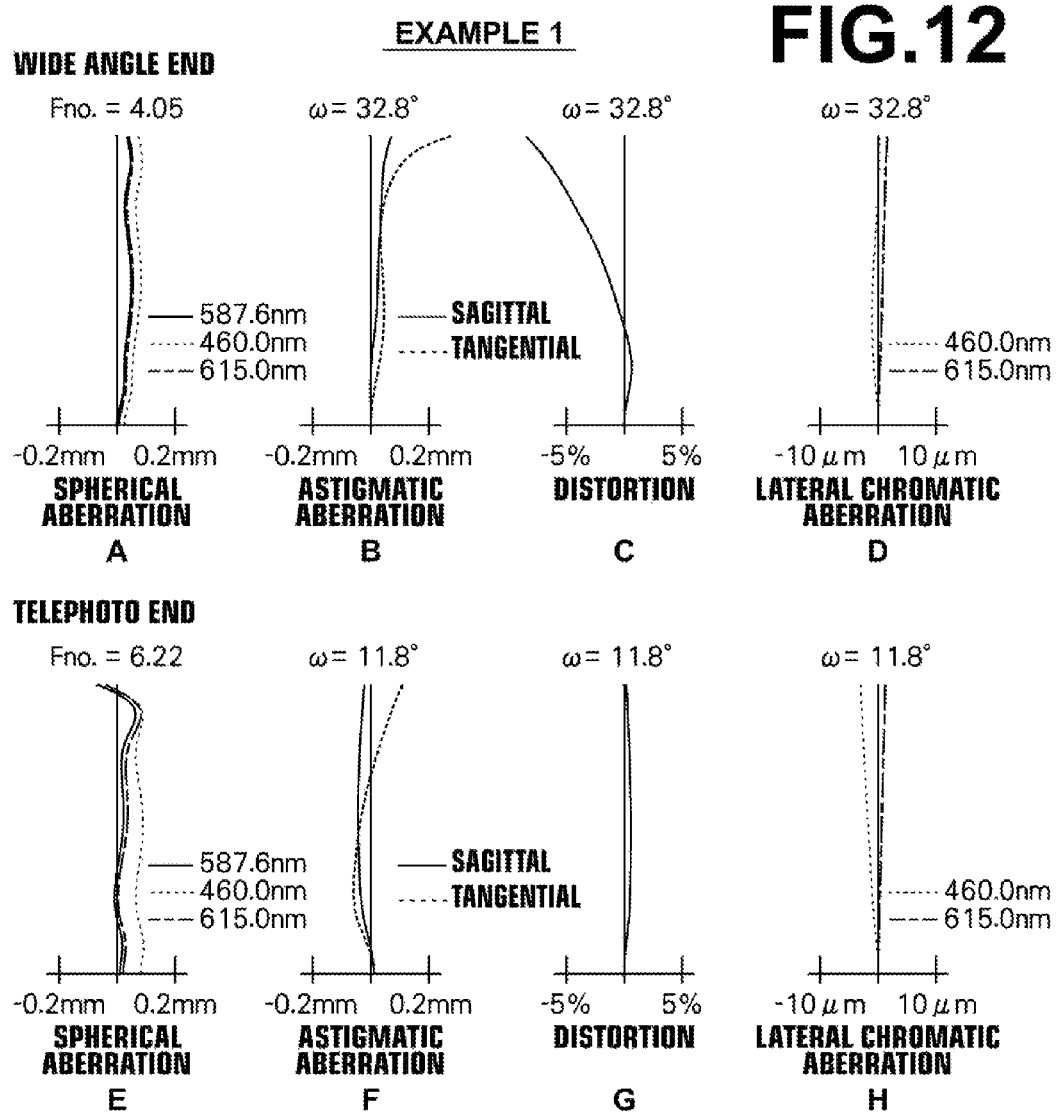
FIG. 12 A through H are graphs that illustrate various aberrations of the zoom lens of the first embodiment.

Hereinafter, embodiments of the present invention will be described in detail with reference to the attached drawings. FIG. 1 is a cross sectional diagram that illustrates the configuration of a zoom lens according to an embodiment of the present invention, and corresponds to a zoom lens of Example 1 to be described later. FIG. 2 through FIG. 11 are cross sectional diagrams that illustrate configurations of zoom lenses according to other embodiments of the present invention, and corresponds to zoom lenses of Examples 2 through 11 to be described later. The basic configurations of the embodiments illustrated in FIG. 1 through FIG. 11 are the same except that a second lens group G2 is constituted by two lenses in the embodiment of FIG. 10. The manners in which the configurations are illustrated are also the same. Therefore, the zoom lenses according to the embodiments of the present invention will be described mainly with reference to FIG. 1.

In FIG. 1, the left side is the object side and the right side is the image side. A of FIG. 1 illustrates the arrangement of the optical system in a state focused on infinity at the wide angle end (shortest focal length state). B of FIG. 1 illustrates the arrangement of the optical system in a state focused on infinity at the telephoto end (longest focal length state). The same applies to FIGS. 2 through 11 to be described later.

Each of the zoom lenses according to the embodiments of the present invention has a first lens group G1 having a negative refractive power, and a second lens group G2 having a positive refractive power, in this order from the object side. An aperture stop St is included in the second lens group G2. The aperture stop St illustrated in the drawings does not necessarily represent the size or shape thereof, but only the position thereof on an optical axis Z.

Note that FIG. 1 illustrates an example in which a parallel plate optical member PP is provided between the second lens group G2 and an imaging surface Sim. When the zoom lens is applied to an imaging apparatus, it is preferable for various filters, such as a cover glass, an infrared ray cutoff filter, and a low pass filter, to be provided between the optical system and the imaging surface Sim, according to the configuration of a camera on which the lens is to be mounted. The optical member PP is provided assuming the presence of the cover glass, the various types of filters, and the like. In addition, recent imaging apparatuses employ the 3 CCD format, in which CCD's are employed for each color in order to improve image quality. In order to be compatible with imaging apparatuses that employ the 3 CCD format, a color separating optical system such as a color separating prism may be inserted between the lens system and the imaging surface Sim. In this case, a color separating optical system may be provided at the position of the optical member PP.

This zoom lens is configured such that the first lens group G1 moves toward the imaging surface Sim along a convex trajectory, the second lens group G2 moves monotonously toward the object side when changing magnification from the wide angle end to the telephoto end, and the aperture stop St moves integrally with the second lens group G2. FIG. 1 schematically illustrates the movement trajectories of the first lens group G1 and the second lens group G2 when changing magnification from the wide angle end to the telephoto end with the arrows indicated between A and B of FIG. 1.

The first lens group G1 is constituted by a first lens L11 having a negative refractive power and a second lens L12 having a positive refractive power, in this order from the object side. Here, the first lens L11 may be a biconcave lens and the second lens L12 may be a positive meniscus lens, as illustrated in the example illustrated in FIG. 1. In the zoom lens of the present invention, at least one of the first lens L11 and the second lens L12 is a plastic lens. In the present embodiment, both of the lenses are plastic lenses.

In the zoom lens of the present invention, the second lens group G2 is constituted by three or fewer lenses that include at least one plastic lens. In the configuration of FIG. 1, the second lens group G2 is constituted by a third lens 21 having a positive refractive power, a fourth lens L22 having a negative refractive power, and a fifth lens L23 having a positive refractive power, in this order from the object side. The third lens L21 may be a biconvex lens, the fourth lens L22 may be a biconcave lens, and the fifth lens L23 may be a positive meniscus lens as in the example illustrated in FIG. 1. Note that in the configuration illustrated in FIG. 1, all of the lenses L21, L22, and L23 of the second lens group G2 are plastic lenses.

Here, the materials of the lenses in the embodiments illustrated in FIG. 2 through FIG. 11 will be described. All of the lenses are plastic lenses except for the first lens L11, the third lens L21 and the fourth lens L22 in the embodiment of FIG. 6, and the fifth lens L23 in the embodiment of FIG. 8.

As described above, the first lens group G1 is constituted by two lenses, and the second lens group G2 is constituted by three lenses. At least one of the first lens L11 and the second lens L12 is a plastic lens (more preferably, both are plastic lenses). At least one of the third lens L21, the fourth lens L22, and the fifth lens L23 is a plastic lens (more preferably, all three are plastic lenses). Thereby, cost reduction can be achieved, and favorable optical performance can be realized while securing a variable magnification ratio of approximately 3× to 4× with a small number of lenses, by setting the power of each lens optimally.

Among the configurations illustrated in FIGS. 1 through 11, the configuration illustrated in FIG. 10 differs from the others in that the second lens group G2 is constituted by two lenses, that is, the third lens L21 and the fourth lens L22. The aforementioned operational advantageous effects can be obtained by this configuration as well.

The present zoom lens satisfies the following conditional formulae:

$$1.6 < |f1|/fw < 2.5 \tag{1}$$

$$1.6 < f2/fw < 2.4 \tag{2}$$

$$0.32 < d2/fw < 0.60 \quad (3)$$

$$2.5 < ft/fw < 4.5 \quad (4)$$

$$1.56 < nd2 < 1.66 \quad (5)$$

$$vd2 < 33 \quad (6)$$

$$1.48 < nd1 < 1.61 \quad (7)$$

$$vd1 > 50 \quad (8)$$

wherein f1 is the focal length of the first lens group, f2 is the focal length of the second lens group, fw is the focal length of the entire system at the wide angle end, d2 is the distance between the first lens and the second lens along an optical axis, ft is the focal length of the entire system at the telephoto end, nd1 is the refractive index of the first lens with respect to the d line, vd1 is the Abbe's number of the first lens with respect to the d line, nd2 is the refractive index of the second lens with respect to the d line, and vd2 is the Abbe's number of the second lens with respect to the d line.

Note that examples of numerical values of each condition determined by the above Conditional Formulae (1) through (8) for each embodiment are shown in Table 34. In addition, Table 34 also shows examples of numerical values of each condition determined by Conditional Formulae (9) through (17) to be described later.

Further, the present zoom lens satisfies the conditional formula below:

$$5.8 < TLw/fw < 8.4 \quad (9)$$

wherein TLw is the distance from the surface of the first lens toward the object side to an imaging surface along the optical axis at the wide angle end, and fw is the focal length of the entire system at the wide angle end.

In addition, the present zoom lens satisfies the following conditional formula:

$$0.7 < D1/fw < 1.2 \quad (10)$$

wherein D1 is the distance from the surface of the first lens toward the object side to the surface of the first lens toward the image side, and fw is the focal length of the entire system at the wide angle end.

Further, it is preferable for the surface of the first lens of the first lens group toward the object side to be concave in a paraxial region in the present zoom lens. Embodiments 1 through 3 and 7 are configured in this manner.

In addition, in the present zoom lens, more desirable ranges for the conditions represented by Conditional Formulae (2), (3), (4), (5), (6), (8), (9) and (10) are as follows:

$$1.7 < f2/fw < 2.3 \quad (2')$$

$$0.32 < d2/fw < 0.55 \quad (3')$$

$$2.7 < ft/fw < 4.5 \quad (4')$$

$$1.56 < nd2 < 1.65 \quad (5')$$

$$vd2 > 29 \quad (6')$$

$$vd1 > 52 \quad (8')$$

$$6.0 < TLw/fw < 8.2 \quad (9')$$

$$0.8 < D1/fw < 1.1 \quad (10')$$

In the present zoom lens, it is desirable for the second lens group to comprise a third lens having a positive refractive power, a fourth lens having a negative refractive power, and a fifth lens having a positive refractive power, in this order from the object side. It is desirable for the third lens to satisfy the following conditional formulae:

$$1.48 < nd3 < 1.61 \quad (11)$$

$$vd3 > 50 \quad (12)$$

and more preferably:

$$vd3 > 52 \quad (12')$$

wherein nd3 is the refractive index of the third lens with respect to the d line and vd3 is the Abbe's number of the third lens with respect to the d line. It is desirable for the fourth lens to satisfy the following conditional formulae:

$$1.56 < nd4 < 1.68 \quad (13)$$

$$vd4 < 33 \quad (14)$$

and more preferably:

$$vd4 < 29 \quad (14')$$

wherein nd4 is the refractive index of the fourth lens with respect to the d line and vd4 is the Abbe's number of the fourth lens with respect to the d line. It is desirable for the fifth lens to satisfy the following conditional formulae:

$$1.48 < nd5 < 1.61 \quad (15)$$

$$vd5 < 50 \quad (16)$$

and more preferably:

$$vd5 > 52 \quad (16')$$

wherein nd5 is the refractive index of the fifth lens with respect to the d line and vd5 is the Abbe's number of the fifth lens with respect to the d line.

Any one or one through five of the above conditional formulae (11), (12), (13), (14), (15), and (16) may be satisfied.

Further, it is preferable for the zoom lens of the present invention to satisfy the following conditional formula:

$$8° < \alpha w < 12° \quad (17)$$

and more preferably $$9° < \alpha w < 11° \quad (17')$$

wherein $\alpha w$ is the emission angle (an angle with respect to a line normal to an imaging plane) of a principal ray of a most exterior angle light beam when an object at infinity is focused on at the wide angle end.

In the zoom lens of the present invention, it is preferable for a configuration to be adopted, wherein the entirety of the second lens group G2 or a portion of the lenses of the second lens group G2 is moved along the optical axis when focusing from infinity to a near distance. More specifically, when the second lens group G2 is constituted by the third lens L21 having a positive refractive power, the fourth lens L22 having a negative refractive power, and the fifth lens L23 having a positive refractive power, in this order from the object side, it is preferable for only the fifth lens L23 to be moved along the optical axis.

Hereinafter, the operational and advantageous effects exhibited by the configurations determined by the above conditional formulae will be described.

Conditional Formula (1) determines the relationship between the focal length of the first lens group G1 and the focal length of the entire system at the wide angle end. If the value of |f1|/fw is less than or equal to the lower limit defined in Conditional Formula (1), the power of the lens L11 and the lens L12 that constitute the first lens group G1 becomes great and the power of the lenses L21, L22, and L23 that constitute the second lens group G2 also becomes great when chromatic aberration is to be suppressed, and it becomes extremely difficult to balance various aberrations. Particularly, correction of field curvature and distortion will become difficult. Further, the amount of tolerance for production error and assembly error of the lenses that constitute the first lens group G1 will become small, which is not preferable. In addition, when employing plastic lenses within the first lens group G1, if the power of the lenses is excessively great, variations in imaging plane positions will occur accompanying changes in refractive indices due to temperature, which is not favorable. Inversely, if the value of |f1|/fw is greater than or equal to the upper limit defined in Conditional Formula (1), the amount of movement of the first lens group G1 when changing magnification will become great and the entire length of the optical system will become great, which is not preferable. The above shortcomings can be prevented in the case that Conditional Formula (1) is satisfied.

Conditional Formula (2) determines the relationship between the focal length of the second lens group G2 and the focal length of the entire system at the wide angle end. If the value of f2/fw is less than or equal to the lower limit defined in Conditional Formula (2), the power of the lenses L21, L22, and L23 that constitute the second lens group G2 becomes great, and correction of spherical aberration will become difficult. Further, the amount of tolerance for production error and assembly error of the lenses that constitute the second lens group G2 will become small, which is not preferable. In addition, when employing plastic lenses within the second lens group G2, if the power of the lenses is excessively great, variations in imaging plane positions will occur accompanying changes in refractive indices due to temperature, which is not favorable. Inversely, if the value of f2/fw is greater than or equal to the upper limit defined in Conditional Formula (2), the amount of movement of the second lens group G2 when changing magnification will become great and the lens system as a whole will become excessively large, which is not preferable. The above shortcomings can be prevented in the case that Conditional Formula (2) is satisfied.

Conditional Formula (3) determines the relationship between the distance between the first lens L11 and the second lens L12 of the first lens group G1 and the focal length of the entire system at the wide angle end. If the value of d2/fw is less than or equal to the lower limit defined in Conditional Formula (3), such a small distance is advantageous from the viewpoint of miniaturization, but is not preferable because correction of spherical aberration will become difficult. Inversely, if the value of d2/fw is greater than or equal to the upper limit defined in Conditional formula (3), the first lens group G1 will become large as a whole, which is not preferable. The above shortcomings can be prevented in the case that Conditional Formula (3) is satisfied. In the present zoom lens, at least one of the lenses of the first lens group G1 is a plastic lens. It is preferable for the value of d2/fw to be within the range defined in Conditional Formula (3) also from the viewpoint of the shape of the flange of the plastic lens and the method by which the first lens L11 and the second lens L12 are to be held.

Conditional Formula (4) determines the relationship between the focal lengths at the wide angle end and the telephoto end, that is, the variable magnification ratio. If the value of ft/fw is less than or equal to the lower limit defined in Conditional Formula (4), the significance of the zoom lens will decrease. Inversely, if the value of ft/fw is greater than or equal to the upper limit defined in Conditional Formula (4), the lens system will become large. In addition, in this type of zoom, decrease in brightness at the telephoto end will become excessive, which is not preferable. If a certain degree of brightness is to be secured at the telephoto end, the burden on the second lens group G2 becomes great, and correction of aberrations with a small number of lenses will become difficult. The above shortcomings can be prevented in the case that Conditional Formula (4) is satisfied.

Conditional Formula (5) and Conditional Formula (7) determine the refractive index of the second lens L12 and the refractive index of the first lens L11, respectively. If the values of nd2 and nd1 become less than the lower limits defined in Conditional Formulae (5) and (7), the occurrence of aberrations will become great. In addition, the radii of curvature (approximate radii of curvature) of the lenses will become great, resulting in the first lens group G1 becoming thick, which is not preferable. In addition, if at least one of the two lenses of the first lens group G1 is a plastic lens for the purpose of reducing cost and reducing weight, if materials of which the aforementioned values exceed the upper limits of the Conditional Formulae (5) and (7) are employed, it will become difficult to balance correction of astigmatic aberrations and lateral chromatic aberrations, which is not preferable. The above shortcomings can be prevented in the case that Conditional Formula (5) or Conditional Formula (7) is satisfied.

Note that although it is more desirable for both of Conditional Formulae (5) and (7) to be satisfied, the aforementioned advantageous effects can be obtained in the case that only one of them is satisfied.

Conditional Formula (6) and Conditional Formula (8) determine the Abbe's number of the second lens and the Abbe's number of the first lens L11, respectively. If the values of vd2 and vd1 become outside the ranges defined in Conditional Formulae (6) and (8), the difference between the Abbe's numbers of the first lens L11 and the second lens L12 will become small, and correction of chromatic aberrations will become difficult. In addition, if the values of vd2 and vd1 become outside the ranges defined in Conditional Formula (6) or Conditional Formula (8), it will be necessary to increase the power of the other of the two lenses of the first lens group G1 (in the case that the Abbe's number of the second lens L12 is determined by Conditional Formula (6), the first lens L11 will be the "other" lens, and in the case that the Abbe's number of the first lens L11 is determined by Conditional Formula (8), the second lens L12 will be the "other" lens) in order to correct chromatic aberrations. Particularly, correction of field curvature and distortion will become difficult, which is not preferable. The above shortcomings can be prevented in the case that Conditional Formula (6) or Conditional Formula (8) is satisfied.

Note that although it is more desirable for both of Conditional Formulae (6) and (8) to be satisfied, the aforementioned advantageous effects can be obtained in the case that only one of them is satisfied.

The above advantageous effects will become more prominent particularly if Conditional Formulae (2'), (4'), (5'), (6'), and (8') are satisfied within the ranges defined in Conditional Formulae (2), (4), (5), (6), and (8).

Meanwhile, if the present zoom lens satisfies Conditional Formula (9), the advantageous effects described below can be obtained. That is, Conditional Formula (9) determines the relationship between the entire optical length and the focal length at the wide angle end. If the value of TLw/fw is less than or equal to the lower limit defined in Conditional Formula (9), the zoom lens can be configured to be compact.

However, the power of each lens will become great, resulting in correction of aberrations becoming difficult. In addition, the tolerances of production error and assembly error will become small, which is not preferable. The above shortcomings can be prevented in the case that Conditional Formula (9) is satisfied.

The above advantageous effects will become more prominent particularly if Conditional Formula (9') is satisfied within the range defined in Conditional Formula (9).

In the case that the present zoom lens satisfies Conditional Formula (10), the advantageous effects described below can be obtained. That is, it is advantageous for the value of D1/fw to be less than the lower limit defined in Conditional Formula (10) from the viewpoint of miniaturization. However, in order for the zoom lens to be miniaturized by decreasing the value of D1/fw in Conditional Formula (10) after a predetermined spatial interval between the first lens L11 and the second lens L12 is secured as determined by Conditional Formula (3), it is necessary for the first lens L11 and the second lens L12 to be formed small or thin. It will become difficult to correct distortion and to balance correction of chromatic aberrations using such lenses, which is not preferable. In addition, difficulties will arise in employing plastic as the material of the lenses of the first lens group G1. Inversely, if the value of D1/fw is greater than or equal to the upper limit defined in Conditional Formula (10), the first lens group G1 will become large, which is not preferable. The above shortcomings can be prevented in the case that Conditional Formula (10) is satisfied.

The above advantageous effects will become more prominent particularly if Conditional Formula (10') is satisfied within the range defined in Conditional Formula (10).

In the present zoom lens, in the case that the two lenses L11 and L12 that constitute the first lens group G1 are both plastic lenses, the advantageous effects described below can be obtained. That is, the first lens group G1 is constituted by the first negative lens L11 and the second positive lens L12. Therefore, in the case that at least one plastic lens is employed in the first lens group G1 and imaging plane variations accompanying temperature changes are considered, if both of the lenses are plastic lenses, it is advantageous in that the powers of the lenses will cancel each other out. In addition, it is preferable for aspherical lenses to be employed in the first lens group G1 in order to obtain favorable optical performance. If both of the first lens L11 and the second lens L12 that constitute the first lens group G1 are plastic lenses, costs can be reduced compared to a case in which aspherical lenses are formed from glass.

In the present zoom lens, particularly in the case that the second lens group G2 comprises the third lens L21 having a positive refractive power, the fourth lens L22 having a negative refractive power, and the fifth lens L23 having a positive refractive power, in this order from the object side, and the lenses satisfy Conditional Formulae (11), (12), 13), (14), (15), and (16), the advantageous effects described below can be obtained. That is, in the second lens group G2 that includes at least one plastic lens, if the positive lens is to be formed by a plastic material, it is preferable for a material having an Abbe's number of approximately 55 to be employed, and if the negative lens is to be formed by a plastic material, it is preferable for a material having an Abbe's number of approximately 25 to be employed. If the other lenses are formed by materials that satisfy Conditional Formulae (11) through (16), field curvature and spherical aberration can be corrected with favorable balance.

Further, the lenses that constitute the second lens group can be formed by comparatively inexpensive glass or plastics, by Conditional Formulae (11) through (16) being satisfied.

The above advantageous effects will become more prominent particularly if Conditional Formulae (12'), (14'), and (16') are satisfied within the ranges defined in Conditional Formulae (12), (14), and (16).

In the present zoom lens, in the case that conditional formula (17) is satisfied when αw is the emission angle (an angle with respect to a line normal to an imaging plane) of a principal ray of a most exterior angle light beam when an object at infinity is focused on at the wide angle end, decreases in peripheral light intensity at an imaging element can be prevented. This advantageous effect will become more prominent if Conditional Formula (17') is satisfied instead of Conditional Formula (17).

In the present zoom lens, in the case that a configuration is adopted, wherein the entirety of the second lens group G2 or a portion of the lenses of the second lens group G2 is moved along the optical axis when focusing from infinity to a near distance, the following advantageous effects can be obtained. That is, in the case that a configuration in which the entirety of the first lens group G1 is moved forward to focus, the effective diameter of the first lens group G1 will become large and it will become necessary to move lenses having large outer diameters. However, such problems can be avoided in the case that the entirety of the second lens group G2 or a portion of the lenses of the second lens group G2 are moved to focus.

The above advantageous effect becomes more prominent in the case that a configuration is adopted, in which the second lens group G2 comprises the third lens L21 having a positive refractive power, the fourth lens L22 having a negative refractive power, and the fifth lens L23 having a positive refractive power, and only the fifth lens L23 is moved along the optical axis.

In the zoom lens of the present invention, if the surface toward the object side of the first lens of the first lens group G1 is concave in the paraxial region, longitudinal chromatic aberration and lateral chromatic aberration can be corrected with favorable balance.

Note that FIG. 1 illustrates an example in which the optical member PP is provided between the lens system and the imaging surface. Alternatively, various filters such as low pass filters and filters that cut off specific wavelength bands may be provided among each of the lenses. As a further alternative, coatings that have the same functions as the various filters may be administered on the surfaces of the lenses.

Next, examples of the numerical values of the zoom lens of the present invention will be described. The cross sections of the lenses of the zoom lenses of Examples 1 through 11 are those illustrated in FIGS. 1 through 11, respectively.

Regarding the zoom lens of Example 1, basic lens data are shown in Table 1, data related to zoom are shown in Table 2, and aspherical surface data are shown in Table 3. Similarly, basic lens data, data related to zoom, and aspherical surface data of the zoom lenses of Examples 2 through 11 are shown in Table 4 through Table 33. Hereinafter, the meanings of the items in the tables will be described for those related to Example 1. The same applies to the tables related to Examples 2 through 11.

In the basic lens data of Table 1, the item Si represents ith (i=1, 2, 3, . . . ) lens surface numbers that sequentially increase from the object side to the image side, with the lens surface at the most object side designated as first. The item Ri represents the radius of curvature of ith surfaces, the item Di represents the distance between an ith surface and an i+1st surface along the optical axis Z. Note that the signs of the radii of curvature are positive in cases that the surface shape is convex toward the object side, and negative in cases that the surface shape is convex toward the image side.

In the basic lens data, the item Ndj represents the refractive index of the jth (j=1, 2, 3, . . . ) constituent element that sequentially increases from the object side to the image side, with the lens at the most object side designated as first, with respect to the d line (wavelength: 587.6 nm). The item vdj represents the Abbe's number of the jth constituent element with respect to the d line.

Note that the aperture stop St is also included in the basic lens data, and the radius of curvature of the surface corresponding to the aperture stop St is shown as "∞ (aperture stop).

D4 and D11 in the basic lens data of Table 1 represents the distances between surfaces that change when changing magnification. D4 is the distance between the first lens group G1 and the second lens group G2, and D11 is the distance between the second lens group G2 and the optical member PP. However, in Example 10, D9 is employed instead of D11.

The data of Table 2 related to zoom shows values of the focal length (f), the F value (Fno.), and the full angle of view (2ω) of the entire system and the distances among surfaces at the wide angle end and at the telephoto end.

In the lens data of Table 1, surface numbers of aspherical surfaces are denoted with the mark "*", and radii of curvature of paraxial regions are shown as the radii of curvature of the aspherical surfaces. The aspherical surface data of Table 3 show the surface numbers of the aspherical surfaces, and the aspherical surface coefficients related to each of the aspherical surfaces. In the numerical values of the aspherical surface data of Table 3, "E-n (n: integer)" means "·10$^{-n}$". Note that the aspherical surface coefficients are the values of the coefficients KA and Ram (m=3, 4, 5, . . . , 12) in the aspherical surface formula below:

$$Zd = C \cdot h^2 / \{1 + (1 - KA \cdot C^2 \cdot h^2)^{1/2}\} + \Sigma RAm \cdot h^m$$

wherein: Zd is the depth of the aspherical surface (the length of a normal line that extends from a point on the aspherical surface having a height h to a plane perpendicular to the optical axis that contacts the peak of the aspherical surface), h is the height (the distance from the optical axis to the surface of the lens), C is the inverse of the paraxial radius of curvature, and KA and Ram are aspherical surface coefficients (m=1, 2, 3, . . . , 12).

The tables below show numerical values which are rounded off at a predetermined number of digits. In addition, degrees are used as the units for angles and mm are used as the units for lengths in the data of the tables below. However, it is possible for optical systems to be proportionately enlarged or proportionately reduced and utilized. Therefore, other appropriate units may be used.

TABLE 1

Example 1: Basic Lens Data

| Si Surface Number | Ri (Radius of Curvature) | Di (Distance) | Ndj (Refractive Index) | vdj (Abbe's Number) |
|---|---|---|---|---|
| *1 | −45.7782 | 1.50 | 1.53389 | 56.0 |
| *2 | 5.6000 | 2.60 | | |
| 3 | 9.3453 | 2.00 | 1.63355 | 23.6 |
| *4 | 15.9288 | D4 | | |
| 5 | ∞ (Aperture Stop) | 0.40 | | |
| *6 | 7.6622 | 2.80 | 1.53389 | 56.0 |
| 7 | −11.1702 | 0.23 | | |
| *8 | −93.6000 | 0.80 | 1.63355 | 23.6 |
| *9 | 10.0000 | 2.76 | | |
| *10 | −14.0449 | 1.30 | 1.53389 | 56.0 |
| *11 | −7.5692 | D11 | | |
| 12 | ∞ | 0.80 | 1.51680 | 64.2 |
| 13 | ∞ | 6.81 | | |

*Aspherical Surface

TABLE 2

Example 1: Data related to Zoom

| Item | Wide Angle End | Telephoto End |
|---|---|---|
| f | 6.96 | 19.69 |
| Fno. | 4.05 | 6.22 |
| 2ω | 65.53 | 23.50 |
| D4 | 19.18 | 2.05 |
| D11 | 7.80 | 20.28 |

TABLE 3

Example 1: Aspherical Surface Coefficients

| | Surface Number | | | |
|---|---|---|---|---|
| | 1 | 2 | 4 | 6 |
| KA | −7.1226025 | 0.6195752 | 0.0455753 | −6.3422506 |
| RA3 | 2.8527533E−03 | 1.3047539E−03 | 8.2616248E−05 | −7.0098873E−04 |
| RA4 | −4.1473757E−04 | 1.9281865E−03 | −6.5096304E−04 | 2.9006712E−03 |
| RA5 | 1.1199128E−04 | −1.1017867E−03 | 3.9845953E−04 | −1.2675233E−03 |
| RA6 | 2.3620192E−05 | 4.1238273E−04 | −1.2520730E−04 | 2.8848355E−04 |
| RA7 | −1.2231466E−05 | −6.2883982E−05 | 4.5479129E−06 | 4.0291067E−05 |
| RA8 | −1.5116175E−06 | −2.2860711E−06 | 3.9213839E−06 | −8.9289567E−06 |
| RA9 | 6.9957609E−07 | 7.0291982E−07 | −2.3604960E−07 | −1.3182102E−05 |
| RA10 | 1.7009286E−08 | 7.4810093E−08 | −5.0184152E−08 | 3.1220073E−06 |
| RA11 | −1.8368261E−08 | 1.5817690E−08 | −9.1998820E−09 | |
| RA12 | 1.2875680E−09 | −4.6616729E−09 | 2.1005738E−09 | |

TABLE 3-continued

Example 1: Aspherical Surface Coefficients

| | Surface Number | | | |
|---|---|---|---|---|
| | 8 | 9 | 10 | 11 |
| KA | −9.9709349 | −1.3798846 | −0.5982977 | −1.4767948 |
| RA3 | 3.6107114E−03 | 3.8373369E−03 | 3.1690869E−03 | 2.8761485E−03 |
| RA4 | −1.2306536E−03 | 7.4428967E−04 | −1.1018539E−04 | −1.4342275E−03 |
| RA5 | 9.4348643E−04 | 1.8179553E−04 | −2.5170759E−04 | 1.3243839E−04 |
| RA6 | −4.2578700E−04 | −5.1888543E−04 | −1.3571412E−05 | 3.9758109E−06 |
| RA7 | −1.3836334E−04 | −5.9873513E−05 | −1.2394601E−05 | −2.1589979E−05 |
| RA8 | 1.2562966E−05 | 2.7863066E−05 | −3.2572811E−06 | −5.7942241E−06 |
| RA9 | 3.7573813E−05 | 1.9831185E−05 | −3.7427885E−06 | 1.5121874E−06 |
| RA10 | −6.6154532E−06 | −1.9975453E−06 | 4.1063227E−06 | 1.4766951E−06 |

TABLE 4

Example 2: Basic Lens Data

| Si Surface Number | Ri (Radius of Curvature) | Di (Distance) | Ndj Refractive (Index) | vdj (Abbe's Number) |
|---|---|---|---|---|
| *1 | −36.1723 | 1.50 | 1.53389 | 56.0 |
| *2 | 5.6000 | 2.55 | | |
| 3 | 12.8834 | 2.00 | 1.63355 | 23.6 |
| *4 | 27.2216 | D4 | | |
| 5 | ∞ (aperture stop) | 0.40 | | |
| *6 | 6.4362 | 2.80 | 1.53389 | 56.0 |
| 7 | −13.9341 | 0.10 | | |
| *8 | −20.4829 | 1.50 | 1.63355 | 23.6 |
| *9 | 19.5276 | 2.89 | | |
| *10 | −36.9597 | 1.30 | 1.53389 | 56.0 |
| *11 | −13.2374 | D11 | | |
| 12 | ∞ | 0.80 | 1.51680 | 64.2 |
| 13 | ∞ | 5.69 | | |

*Aspherical Surface

TABLE 5

Example 2: Data related to Zoom

| Item | Wide Angle End | Telephoto End |
|---|---|---|
| f | 7.38 | 20.88 |
| Fno. | 4.15 | 6.71 |
| 2ω | 62.54 | 22.21 |
| D4 | 15.84 | 1.64 |
| D11 | 7.96 | 21.70 |

TABLE 6

Example 2: Aspherical Surface Coefficients

| | Surface Number | | | |
|---|---|---|---|---|
| | 1 | 2 | 4 | 6 |
| KA | −8.3339294 | 0.2950461 | 0.1809931 | −5.2520007 |
| RA3 | 2.5107278E−03 | 1.0759732E−03 | 2.0720108E−04 | −7.4536474E−04 |
| RA4 | −3.6268458E−04 | 2.0269487E−03 | −8.5465980E−04 | 3.8433786E−03 |
| RA5 | 1.2116937E−04 | −9.3407823E−04 | 3.8595986E−04 | −1.3119434E−03 |
| RA6 | 2.6557626E−05 | 4.1157299E−04 | −1.2466395E−04 | 2.7815655E−04 |
| RA7 | −1.2974093E−05 | −6.4819695E−05 | 4.7550974E−06 | 3.6053899E−05 |
| RA8 | −1.5646287E−06 | −2.2852046E−06 | 3.8952897E−06 | −7.6531280E−06 |
| RA9 | 6.9574088E−07 | 6.9574462E−07 | −2.7400221E−07 | −1.2136056E−05 |
| RA10 | 1.9236761E−08 | 7.3489816E−08 | −4.7370666E−08 | 2.7897433E−06 |
| RA11 | −1.8182643E−08 | 1.6887523E−08 | −8.6512233E−09 | |
| RA12 | 1.2468090E−09 | −4.6889814E−09 | 1.9721267E−09 | |

| | Surface Number | | | |
|---|---|---|---|---|
| | 8 | 9 | 10 | 11 |
| KA | −5.6043743 | −0.5555402 | −8.4990841 | −1.9855906 |
| RA3 | 3.4600106E−03 | 3.4788651E−03 | 3.5272674E−03 | 3.4017878E−03 |
| RA4 | −4.8935727E−04 | 1.7012768E−03 | 1.2313817E−04 | −9.0232225E−04 |
| RA5 | 1.1759613E−03 | 4.4636169E−04 | −2.3282924E−04 | 1.6516071E−04 |
| RA6 | −4.0586198E−04 | −5.0187279E−04 | −1.5781765E−05 | 9.0857612E−06 |
| RA7 | −1.3281129E−04 | −3.8004709E−05 | −1.5071274E−05 | −2.2665629E−05 |
| RA8 | 1.4338953E−05 | 3.2438577E−05 | −3.3652124E−06 | −8.5604380E−06 |
| RA9 | 3.5840287E−05 | 1.7720453E−05 | −4.8960441E−06 | 5.2633004E−07 |
| RA10 | −7.6399851E−06 | −4.1672083E−06 | 3.9463872E−06 | 1.7768476E−06 |

TABLE 7

Example 3: Basic Lens Data

| Si Surface Number | Ri (Radius of Curvature) | Di (Distance) | Ndj (Refractive Index) | νdj (Abbe's Number) |
|---|---|---|---|---|
| *1 | −43.3378 | 1.10 | 1.49023 | 57.5 |
| *2 | 5.6000 | 2.35 | | |
| *3 | 7.1102 | 1.55 | 1.63355 | 23.6 |
| *4 | 9.9860 | D4 | | |
| 5 | ∞ (Aperture Stop) | 0.47 | | |
| *6 | 9.6405 | 2.53 | 1.49023 | 57.5 |
| 7 | −7.8753 | 0.15 | | |
| *8 | 50.2711 | 0.80 | 1.63355 | 23.6 |
| *9 | 7.7229 | 1.80 | | |
| *10 | −9.7110 | 1.50 | 1.49023 | 57.5 |
| *11 | −5.6004 | D11 | | |
| 12 | ∞ | 0.80 | 1.51680 | 64.2 |
| 13 | ∞ | 8.99 | | |

*Aspherical Surface

TABLE 8

Example 3: Data related to Zoom

| Item | Wide Angle End | Telephoto End |
|---|---|---|
| f | 6.80 | 19.22 |
| Fno. | 3.99 | 6.07 |
| 2ω | 65.18 | 23.70 |
| D4 | 20.00 | 1.55 |
| D11 | 6.00 | 16.84 |

TABLE 9

Example 3: Aspherical Surface Coefficients

| | Surface Number | | | | |
|---|---|---|---|---|---|
| | 1 | 2 | 3 | 4 | 6 |
| KA | 9.8490489 | 0.7800552 | 0.2634990 | −0.2879118 | −8.8108226 |
| RA3 | 3.9171475E−03 | 4.6147501E−03 | 4.4822471E−04 | 2.9717732E−04 | −1.8989625E−03 |
| RA4 | −2.0999475E−03 | −2.2526171E−03 | −9.1341364E−04 | −1.0707836E−03 | 2.2416915E−03 |
| RA5 | 9.5119459E−04 | 1.5800216E−04 | 8.5336149E−05 | 2.6916051E−04 | −1.5952161E−03 |
| RA6 | −1.0277459E−04 | 4.3381595E−04 | 1.4802372E−05 | −7.4643977E−05 | 2.8569496E−04 |
| RA7 | −1.0711309E−05 | −1.0661816E−04 | 6.5765676E−07 | 4.2292477E−06 | 4.4192425E−05 |
| RA8 | −1.2110964E−06 | −1.8896635E−06 | 3.4276619E−07 | 3.8007096E−06 | −8.0037308E−06 |
| RA9 | 8.1778137E−07 | 1.6369907E−06 | −9.8880257E−08 | −3.9362713E−07 | −1.1468797E−05 |
| RA10 | 1.8079595E−08 | 9.2871659E−08 | −2.8079998E−09 | −4.4332542E−08 | 2.7215913E−06 |
| RA11 | −2.0862140E−08 | 6.8236261E−09 | 0.0000000E+00 | −8.5695038E−09 | |
| RA12 | 1.4080305E−09 | −5.4594490E−09 | 0.0000000E+00 | 2.1527753E−09 | |

| | Surface Number | | | |
|---|---|---|---|---|
| | 8 | 9 | 10 | 11 |
| KA | 8.8730711 | −3.2770087 | 0.5599204 | 1.7486704 |
| RA3 | 1.0104922E−02 | 1.0978729E−02 | 3.5684492E−03 | 1.3896331E−03 |
| RA4 | −7.4063153E−03 | −5.3110309E−03 | −9.1794881E−04 | −4.9582765E−05 |
| RA5 | 3.0747711E−03 | 2.1066081E−03 | −5.2927082E−04 | −8.7203221E−05 |
| RA6 | −4.5705206E−04 | −5.4615359E−04 | −1.4307742E−05 | −8.9394954E−06 |
| RA7 | −1.8683959E−04 | −9.4059283E−05 | 1.0264861E−07 | −2.7449758E−06 |
| RA8 | 1.2193836E−05 | 2.8017045E−05 | −1.5035590E−06 | −1.0528679E−07 |
| RA9 | 3.7188341E−05 | 1.6966346E−05 | 2.2585602E−06 | 2.3182928E−06 |
| RA10 | −7.7993499E−06 | −3.4407835E−06 | 1.2077026E−06 | 8.2026054E−08 |

TABLE 10

Example 4: Basic Lens Data

| Si Surface Number | Ri (Radius of Curvature) | Di (Distance) | Ndj (Refractive Index) | νdj (Abbe's Number) |
|---|---|---|---|---|
| *1 | 144.0325 | 1.10 | 1.53389 | 56.0 |
| *2 | 5.6000 | 3.00 | | |
| *3 | 7.9801 | 1.55 | 1.63355 | 23.6 |
| *4 | 8.9318 | D4 | | |
| 5 | ∞ (Aperture Stop) | 0.44 | | |
| *6 | 8.3631 | 1.30 | 1.53389 | 56.0 |
| 7 | −1633.0529 | 2.00 | | |
| *8 | 110.5807 | 0.80 | 1.63355 | 23.6 |
| *9 | 8.9873 | 0.40 | | |
| 10 | 32.2904 | 1.50 | 1.53389 | 56.0 |
| 11 | −7.1849 | D11 | | |
| 12 | ∞ | 0.80 | 1.51680 | 64.2 |
| 13 | ∞ | 6.98 | | |

*Aspherical Surface

TABLE 11

Example 4: Data related to Zoom

| Item | Wide Angle End | Telephoto End |
|---|---|---|
| f | 6.90 | 19.52 |
| Fno. | 3.93 | 6.55 |
| 2ω | 62.56 | 23.23 |
| D4 | 15.33 | 1.12 |
| D11 | 8.33 | 20.58 |

TABLE 12

Example 4: Aspherical Surface Coefficients

| | Surface Number | | | |
|---|---|---|---|---|
| | 1 | 2 | 3 | 4 |
| KA | −9.9019876 | 1.1194390 | 1.2841888 | 0.6734029 |
| RA3 | 2.3283676E−03 | 3.4022532E−03 | 1.2065872E−04 | −6.9519228E−04 |
| RA4 | 2.7428986E−03 | 3.7297971E−03 | −4.8507108E−04 | −2.0784348E−05 |
| RA5 | −1.3502676E−04 | −1.0396162E−03 | 1.0928149E−05 | −5.7245186E−04 |
| RA6 | −1.8552530E−04 | 5.5289941E−04 | 5.0455929E−06 | 1.6187626E−04 |
| RA7 | 3.8569484E−05 | −1.3489087E−04 | −1.0756927E−06 | −2.8483954E−05 |
| RA8 | −2.9069010E−06 | −1.2545610E−06 | −1.5939976E−06 | 2.5837546E−06 |
| RA9 | −6.4751287E−08 | 2.8789255E−06 | 1.0739339E−07 | −1.7783149E−07 |
| RA10 | 4.8487798E−08 | 1.0350011E−07 | 3.6806068E−08 | −8.4141652E−09 |
| RA11 | −6.0302197E−09 | −2.9037285E−08 | 0.0000000E+00 | 2.1024668E−09 |
| RA12 | 2.2558591E−10 | −7.7561063E−09 | 0.0000000E+00 | 1.4432385E−09 |

| | Surface Number | | |
|---|---|---|---|
| | 6 | 8 | 9 |
| KA | −9.9999908 | 6.8887740 | −6.1954444 |
| RA3 | −4.3200052E−04 | 3.6008318E−03 | 3.3077721E−03 |
| RA4 | 2.8595637E−03 | −5.9959424E−03 | −4.1002248E−03 |
| RA5 | −8.4684731E−04 | 3.1600517E−03 | 2.7712878E−03 |
| RA6 | 1.1431224E−04 | −3.8210610E−04 | −4.5136445E−04 |
| RA7 | 1.5203758E−08 | −1.7769514E−04 | −1.1089853E−04 |
| RA8 | −7.9369744E−07 | −2.1218006E−06 | 1.2886733E−05 |
| RA9 | −2.5973870E−06 | 2.7972846E−05 | 1.1016579E−05 |
| RA10 | 6.2278844E−07 | −4.5509830E−06 | −1.8665400E−06 |

TABLE 13

Example 5: Basic Lens Data

| Si Surface Number | Ri (Radius of Curvature) | Di (Distance) | Ndj (Refractive Index) | νdj (Abbe's Number) |
|---|---|---|---|---|
| *1 | 88.9654 | 1.50 | 1.53389 | 56.0 |
| *2 | 5.6000 | 2.71 | | |
| 3 | 11.9711 | 1.80 | 1.63355 | 23.6 |
| *4 | 20.9287 | D4 | | |
| 5 | ∞ (aperture stop) | 0.40 | | |
| *6 | 6.3063 | 3.00 | 1.53389 | 56.0 |
| 7 | −15.4394 | 0.18 | | |
| *8 | −31.9798 | 1.50 | 1.63355 | 23.6 |
| *9 | 14.4800 | 3.72 | | |
| *10 | −10.1711 | 1.35 | 1.53389 | 56.0 |
| *11 | −8.2905 | D11 | | |
| 12 | ∞ | 0.80 | 1.51680 | 64.2 |
| 13 | ∞ | 9.15 | | |

*Aspherical Surface

TABLE 14

Example 5: Data related to Zoom

| Item | Wide Angle End | Telephoto End |
|---|---|---|
| f | 6.99 | 26.37 |
| Fno. | 4.21 | 7.57 |
| 2ω | 65.42 | 17.50 |
| D4 | 26.29 | 1.61 |
| D11 | 2.99 | 20.25 |

TABLE 15

Example 5: Aspherical Surface Coefficients

| | Surface Number | | | |
|---|---|---|---|---|
| | 1 | 2 | 4 | 6 |
| KA | −1.6459038 | 0.8241924 | −0.2421523 | −4.9011996 |
| RA3 | 2.5104129E−03 | 1.4151370E−04 | 6.0020392E−04 | −4.4180180E−04 |
| RA4 | −7.0415771E−04 | 2.0624822E−03 | −1.3892203E−03 | 3.9146992E−03 |
| RA5 | 1.5823497E−03 | −1.1145733E−03 | 6.0734239E−04 | −1.1975769E−03 |
| RA6 | 2.7559544E−05 | 4.0254908E−04 | −1.3050292E−04 | 2.7882909E−04 |
| RA7 | −1.5813340E−05 | −7.1962375E−05 | −1.6197665E−06 | 3.3116823E−05 |
| RA8 | −1.5928930E−06 | −2.3520390E−06 | 3.9762768E−06 | −8.8658298E−06 |
| RA9 | 7.3272048E−07 | 8.5240067E−07 | −2.5073482E−08 | −1.1312120E−05 |
| RA10 | 2.4298729E−08 | 7.0859091E−08 | −4.3710629E−08 | 2.7057187E−06 |

TABLE 15-continued

Example 5: Aspherical Surface Coefficients

| | | | |
|---|---|---|---|
| RA11 | −1.7329718E−08 | 1.9252959E−08 | −1.2493929E−08 |
| RA12 | 1.0647408E−09 | −4.6691124E−09 | 1.8655152E−09 |

| | Surface Number | | | |
|---|---|---|---|---|
| | 8 | 9 | 10 | 11 |
| KA | 0.8208858 | −0.8011883 | −1.4343674 | −2.0125016 |
| RA3 | 2.9429670E−05 | −4.1561541E−04 | 1.1718057E−03 | 1.9371283E−03 |
| RA4 | 1.3812829E−05 | 2.0555216E−03 | −8.5544121E−04 | −1.5553318E−03 |
| RA5 | 1.0140360E−03 | 5.0218416E−04 | 9.3059624E−05 | 2.0610265E−04 |
| RA6 | −4.2261670E−04 | −4.9280593E−04 | −1.8515247E−05 | −8.4626843E−06 |
| RA7 | −1.3097041E−04 | −4.9799282E−05 | −2.3754525E−05 | −2.0399743E−05 |
| RA8 | 1.2648641E−05 | 2.7168745E−06 | −1.0943947E−05 | −4.9006527E−06 |
| RA9 | 3.8610882E−05 | 1.8776885E−05 | −2.0169207E−06 | 1.6088504E−06 |
| RA10 | −7.8245840E−06 | −2.3382397E−06 | 4.8954520E−06 | 1.4732520E−06 |

TABLE 16

Example 6: Basic Lens Data

| Si Surface Number | Ri (Radius of Curvature) | Di (Distance) | Ndj (Refractive Index) | vdj (Abbe's Number) |
|---|---|---|---|---|
| *1 | 30.5754 | 1.50 | 1.59522 | 67.7 |
| *2 | 5.6000 | 3.40 | | |
| 3 | 12.0756 | 1.80 | 1.63355 | 23.6 |
| *4 | 15.1651 | D4 | | |
| 5 | ∞ (Aperture Stop) | 0.40 | | |
| *6 | 6.9088 | 1.91 | 1.59522 | 67.7 |
| 7 | −16.6941 | 0.60 | | |
| *8 | 47.4518 | 0.80 | 1.67270 | 32.1 |
| *9 | 5.6000 | 0.50 | | |
| 10 | −30.0216 | 1.20 | 1.53389 | 56.0 |
| 11 | −6.3690 | D11 | | |
| 12 | ∞ | 0.80 | 1.51680 | 64.2 |
| 13 | ∞ | 5.70 | | |

*Aspherical Surface

TABLE 17

Example 6: Data related to Zoom

| Item | Wide Angle End | Telephoto End |
|---|---|---|
| f | 6.64 | 18.78 |
| Fno. | 4.14 | 6.45 |
| 2ω | 66.47 | 24.15 |
| D4 | 16.95 | 1.20 |
| D11 | 7.83 | 18.06 |

TABLE 18

Example 6: Aspherical Surface Coefficients

| | Surface Number | | |
|---|---|---|---|
| | 1 | 2 | 4 |
| KA | 5.6715376 | 1.1205322 | −10.0000074 |
| RA3 | 8.0379291E−04 | 1.2495915E−03 | −3.8608946E−04 |
| RA4 | −1.1139418E−04 | −6.2813665E−06 | 3.7457055E−04 |
| RA5 | 3.3636253E−04 | −3.9727116E−06 | −3.0572366E−04 |
| RA6 | −1.4477662E−04 | 1.9475997E−04 | 1.5483197E−04 |
| RA7 | 1.8157657E−05 | −9.5451205E−05 | −3.9129332E−05 |
| RA8 | −7.2929086E−07 | 1.6819623E−06 | 2.0953145E−06 |
| RA9 | 1.9179153E−07 | 3.4910952E−06 | 4.2839891E−07 |

TABLE 18-continued

Example 6: Aspherical Surface Coefficients

| RA10 | 4.7720113E−09 | 2.2499427E−08 | −1.6590786E−08 |
|---|---|---|---|
| RA11 | −1.0247021E−08 | −5.8293729E−08 | −6.6963293E−09 |
| RA12 | 8.6053779E−10 | −3.1813511E−09 | 4.9722428E−10 |

| | Surface Number | | |
|---|---|---|---|
| | 6 | 8 | 9 |
| KA | −9.5953668 | 1.8855545 | −5.5187848 |
| RA3 | −3.9275430E−04 | 2.0830315E−03 | 1.9320204E−03 |
| RA4 | 3.9985179E−03 | −6.2895449E−03 | −1.7425499E−03 |
| RA5 | −8.3523812E−04 | 2.6253374E−03 | 1.9359943E−03 |
| RA6 | −3.0997757E−05 | −1.7611415E−04 | −2.8515333E−04 |
| RA7 | −3.0620303E−05 | −1.1313965E−04 | −5.3864927E−05 |
| RA8 | 1.6852626E−05 | −1.0125080E−05 | −2.4601854E−06 |
| RA9 | 1.8499872E−06 | 1.5842712E−05 | −7.1467259E−06 |
| RA10 | −1.5692237E−06 | −2.3763956E−07 | 5.6488227E−06 |

TABLE 19

Example 7: Basic Lens Data

| Si Surface Number | Ri (Radius of Curvature) | Di (Distance) | Ndj (Refractive Index) | vdj (Abbe's Number) |
|---|---|---|---|---|
| *1 | −45.8176 | 1.10 | 1.53389 | 56.0 |
| *2 | 5.6000 | 2.45 | | |
| 3 | 8.5623 | 1.55 | 1.63355 | 23.6 |
| *4 | 13.7020 | D4 | | |
| 5 | ∞ (aperture stop) | 0.40 | | |
| *6 | 8.2531 | 2.03 | 1.53389 | 56.0 |
| 7 | −32.3010 | 0.60 | | |
| *8 | 25.7176 | 0.80 | 1.63355 | 23.6 |
| *9 | 6.1403 | 0.50 | | |
| 10 | −237.3935 | 1.20 | 1.53389 | 56.0 |
| 11 | −6.0684 | D11 | | |
| 12 | ∞ | 0.80 | 1.51680 | 64.2 |
| 13 | ∞ | 7.25 | | |

*Aspherical Surface

TABLE 20

Example 7: Data related to Zoom

| Item | Wide Angle End | Telephoto End |
|---|---|---|
| f | 5.72 | 16.17 |
| Fno. | 3.89 | 5.75 |

TABLE 20-continued

Example 7: Data related to Zoom

| Item | Wide Angle End | Telephoto End |
|---|---|---|
| $2\omega$ | 74.73 | 28.06 |
| D4 | 20.00 | 1.83 |
| D11 | 6.49 | 15.46 |

TABLE 21

Example 7: Aspherical Surface Coefficients

| | Surface Number | | |
|---|---|---|---|
| | 1 | 2 | 4 |
| KA | −1.0811935 | 1.0203659 | −9.9999998 |
| RA3 | 4.3272719E−03 | 5.4136153E−03 | −3.7249806E−04 |
| RA4 | −4.2857861E−05 | 1.5082152E−04 | 3.4398311E−04 |
| RA5 | 2.3062689E−04 | −3.2067687E−04 | −2.2042963E−04 |
| RA6 | −1.8928364E−05 | 2.7760459E−04 | 1.8002703E−04 |
| RA7 | 3.2687844E−05 | −1.1233959E−04 | −4.9608384E−05 |
| RA8 | −1.0060948E−06 | 1.0797904E−06 | 2.2736031E−06 |
| RA9 | −9.5335465E−08 | 3.6438306E−06 | 6.5195038E−07 |
| RA10 | 1.3286261E−08 | 3.2779959E−08 | −1.7714200E−08 |
| RA11 | −3.8298597E−09 | −4.9795892E−08 | −9.7665994E−09 |
| RA12 | 3.0048861E−10 | −2.7347167E−09 | 4.9605321E−10 |

| | Surface Number | | |
|---|---|---|---|
| | 6 | 8 | 9 |
| KA | −9.9999950 | −8.9717760 | −7.5814454 |
| RA3 | −5.5332616E−04 | 3.5991365E−03 | 3.0072551E−03 |
| RA4 | 1.8242776E−03 | −6.3730419E−03 | −1.5107032E−03 |
| RA5 | −2.0928049E−04 | 2.7081788E−03 | 1.5839390E−03 |
| RA6 | −6.7421392E−05 | −6.7182605E−05 | −1.5144796E−04 |
| RA7 | −1.3914226E−04 | −7.6057549E−05 | 1.2336942E−05 |

TABLE 21-continued

Example 7: Aspherical Surface Coefficients

| RA8 | 1.9933839E−06 | −2.9960225E−05 | −1.5306404E−05 |
|---|---|---|---|
| RA9 | 5.7023153E−05 | −2.9594302E−05 | −6.0435965E−05 |
| RA10 | −1.6279035E−05 | 1.6328799E−05 | 2.3527669E−05 |

TABLE 22

Example 8: Basic Lens Data

| Si Surface Number | Ri (Radius of Curvature) | Di (Distance) | Ndj (Refractive Index) | vdj (Abbe's Number) |
|---|---|---|---|---|
| *1 | 220.6530 | 1.70 | 1.53389 | 56.0 |
| *2 | 5.3806 | 2.45 | | |
| 3 | 13.1537 | 2.10 | 1.58364 | 30.3 |
| *4 | 31.6078 | D4 | | |
| 5 | ∞ (Aperture Stop) | 0.40 | | |
| *6 | 8.2409 | 2.67 | 1.53389 | 56.0 |
| 7 | −14.2284 | 1.41 | | |
| *8 | 77.2440 | 0.80 | 1.63355 | 23.6 |
| *9 | 8.2989 | 2.04 | | |
| *10 | −23.0224 | 1.34 | 1.58913 | 61.1 |
| *11 | −8.4063 | D11 | | |
| 12 | ∞ | 0.80 | 1.51680 | 64.2 |
| 13 | ∞ | 4.89 | | |

*Aspherical Surface

TABLE 23

Example 8: Data related to Zoom

| Item | Wide Angle End | Telephoto End |
|---|---|---|
| f | 6.92 | 19.56 |
| Fno. | 3.96 | 5.94 |
| $2\omega$ | 66.25 | 23.70 |
| D4 | 20.33 | 1.41 |
| D11 | 8.10 | 19.13 |

TABLE 24

Example 8: Aspherical Surface Coefficients

| | Surface Number | | | |
|---|---|---|---|---|
| | 1 | 2 | 4 | 6 |
| KA | −7.4050529 | 0.2695551 | 0.2684706 | −5.8766702 |
| RA3 | 1.6628880E−03 | 1.4779350E−03 | −1.4837013E−04 | −8.7397506E−04 |
| RA4 | −4.2100664E−04 | 9.8292456E−04 | −5.6177095E−04 | 2.8383604E−03 |
| RA5 | 1.6475991E−04 | −5.3978142E−04 | 2.7863028E−04 | −1.3072333E−03 |
| RA6 | 3.5785666E−05 | 3.9787588E−04 | −1.2773099E−04 | 2.7826944E−04 |
| RA7 | −1.7642403E−05 | −7.7951201E−05 | 8.6884677E−06 | 3.6328143E−05 |
| RA8 | −1.6855105E−06 | −2.4137627E−06 | 3.9476644E−06 | −7.9576196E−06 |
| RA9 | 7.6645902E−07 | 7.2965976E−07 | −2.7075149E−07 | −9.9610375E−06 |
| RA10 | 2.3363698E−08 | 7.7374343E−08 | −4.5563847E−08 | 2.2972963E−06 |
| RA11 | −1.8215668E−08 | 2.0477469E−08 | −1.0888842E−08 | |
| RA12 | 1.1650664E−09 | −4.2421982E−09 | 2.0378314E−09 | |

| | Surface Number | | | |
|---|---|---|---|---|
| | 8 | 9 | 10 | 11 |
| KA | −8.5183759 | −1.1117759 | −1.1146718 | −2.1814080 |
| RA3 | 5.9760640E−04 | 1.3955682E−04 | 1.0084401E−03 | 9.3223119E−04 |
| RA4 | −1.6739549E−03 | 6.6924237E−04 | 4.9125931E−04 | −7.0431249E−04 |
| RA5 | 1.2789514E−03 | 4.1350513E−04 | −1.6272755E−04 | 7.8965144E−05 |
| RA6 | −4.2123552E−04 | −4.9795448E−04 | −2.5316441E−05 | −1.6754097E−05 |
| RA7 | −1.2998849E−04 | −4.1384977E−05 | −2.7576484E−05 | −2.7653093E−05 |

TABLE 24-continued

Example 8: Aspherical Surface Coefficients

| | | | | |
|---|---|---|---|---|
| RA8 | 1.7980115E−05 | 2.9921492E−05 | −1.3031535E−05 | −5.0026142E−06 |
| RA9 | 3.9163180E−05 | 1.9148945E−05 | −9.9817777E−07 | 2.4893074E−06 |
| RA10 | −8.3255838E−06 | −2.3754123E−06 | 5.1313893E−06 | 1.4055674E−06 |

TABLE 25

Example 9: Basic Lens Data

| Si Surface Number | Ri (Radius of Curvature) | Di (Distance) | Ndj (Refractive Index) | vdj (Abbe's Number) |
|---|---|---|---|---|
| *1 | 302.0502 | 1.70 | 1.53389 | 56.0 |
| *2 | 5.6000 | 2.52 | | |
| 3 | 9.7968 | 1.80 | 1.63355 | 23.6 |
| *4 | 14.5928 | D4 | | |
| 5 | ∞ (Aperture Stop) | 0.40 | | |
| *6 | 7.2538 | 2.80 | 1.53389 | 56.0 |
| 7 | −7.7898 | 0.15 | | |
| *8 | −17.4785 | 1.04 | 1.58364 | 30.3 |

TABLE 26

Example 9: Data related to Zoom

| Item | Wide Angle End | Telephoto End |
|---|---|---|
| f | 7.05 | 19.94 |
| Fno. | 4.00 | 6.21 |
| 2ω | 65.14 | 23.31 |
| D4 | 19.91 | 2.06 |
| D11 | 9.04 | 20.58 |

TABLE 27

Example 9: Aspherical Surface Coefficients

| | Surface Number | | | |
|---|---|---|---|---|
| | 1 | 2 | 4 | 6 |
| KA | −7.5665234 | 0.4681314 | −0.2005371 | −5.6120555 |
| RA3 | 2.4192415E−03 | 2.3784810E−03 | −6.3007061E−05 | −1.0376105E−03 |
| RA4 | −4.4731871E−04 | 9.4379455E−04 | −6.1059397E−04 | 3.3049490E−03 |
| RA5 | 1.7496179E−04 | −5.3494218E−04 | 3.0623013E−04 | −1.4553319E−03 |
| RA6 | 3.4792988E−05 | 3.9776977E−04 | −1.2494153E−04 | 2.7405038E−04 |
| RA7 | −1.8101342E−05 | −7.9143834E−05 | 8.6428763E−06 | 3.1968874E−05 |
| RA8 | −1.6667021E−06 | −2.4294891E−06 | 3.9305850E−06 | −8.1301284E−06 |
| RA9 | 7.7816384E−07 | 7.2836849E−07 | −2.8048845E−07 | −1.0193861E−05 |
| RA10 | 2.2474458E−08 | 7.6172436E−08 | −4.7799602E−08 | 2.3546195E−06 |
| RA11 | −1.8269282E−08 | 2.0119815E−08 | −1.0355952E−08 | |
| RA12 | 1.1719551E−09 | −4.1627089E−09 | 2.1349858E−09 | |

| | Surface Number | | | |
|---|---|---|---|---|
| | 8 | 9 | 10 | 11 |
| KA | 4.0218954 | −1.0955427 | −0.7535765 | −1.7736191 |
| RA3 | 3.0027320E−03 | 2.9841267E−03 | 1.7909313E−03 | 1.1495982E−03 |
| RA4 | −2.1664072E−03 | 6.4405911E−04 | 1.1806457E−04 | −1.1042296E−03 |
| RA5 | 1.2801072E−03 | 1.9239372E−04 | −1.5662827E−04 | 1.0041498E−04 |
| RA6 | −4.2011643E−04 | −4.9887499E−04 | −2.6491528E−05 | −1.4063624E−05 |
| RA7 | −1.2891568E−04 | −4.1843075E−05 | −2.8602475E−05 | −2.5513940E−05 |
| RA8 | 1.8872516E−05 | 2.9754706E−05 | −1.3386085E−05 | −4.8680042E−06 |
| RA9 | 3.9276745E−05 | 1.9428754E−05 | −6.4350812E−07 | 2.5465130E−06 |
| RA10 | −8.5500394E−06 | −2.4287579E−06 | 5.3285179E−06 | 1.4034663E−06 |

TABLE 25-continued

Example 9: Basic Lens Data

| Si Surface Number | Ri (Radius of Curvature) | Di (Distance) | Ndj (Refractive Index) | vdj (Abbe's Number) |
|---|---|---|---|---|
| *9 | 8.2962 | 2.07 | | |
| *10 | −18.9287 | 1.39 | 1.53389 | 56.0 |
| *11 | −7.7084 | D11 | | |
| 12 | ∞ | 0.80 | 1.51680 | 64.2 |
| 13 | ∞ | 5.27 | | |

*Aspherical Surface

TABLE 28

Example 10: Basic Lens Data

| Si Surface Number | Ri (Radius of Curvature) | Di (Distance) | Ndj (Refractive Index) | vdj (Abbe's Number) |
|---|---|---|---|---|
| *1 | 152.8403 | 1.10 | 1.53389 | 56.0 |
| *2 | 5.6000 | 2.40 | | |
| *3 | 6.7668 | 1.67 | 1.63355 | 23.6 |
| *4 | 8.3088 | D4 | | |
| 5 | ∞ (Aperture Stop) | 0.40 | | |
| *6 | 5.6005 | 3.20 | 1.53389 | 56.0 |
| 7 | −9.6914 | 0.30 | | |
| *8 | −5.5986 | 1.20 | 1.63355 | 23.6 |
| *9 | −13.3968 | D9 | | |

TABLE 28-continued

Example 10: Basic Lens Data

| Si Surface Number | Ri (Radius of Curvature) | Di (Distance) | Ndj (Refractive Index) | vdj (Abbe's Number) |
|---|---|---|---|---|
| 10 | ∞ | 0.80 | 1.51680 | 64.2 |
| 11 | ∞ | 7.48 | | |

*Aspherical Surface

TABLE 29

Example 10: Data related to Zoom

| Item | Wide Angle End | Telephoto End |
|---|---|---|
| f | 6.93 | 19.61 |
| Fno. | 4.04 | 6.40 |
| 2ω | 63.50 | 23.11 |
| D4 | 17.60 | 2.11 |
| D9 | 5.65 | 15.60 |

TABLE 30

Example 10: Aspherical Surface Coefficients

| | Surface Number | | | |
|---|---|---|---|---|
| | 1 | 2 | 3 | 4 |
| KA | −9.7725813 | 0.3128584 | −1.5138605 | −1.7838278 |
| RA3 | 5.4159306E−04 | 7.8141215E−04 | 8.5908337E−04 | 1.2437535E−03 |
| RA4 | 1.7339757E−03 | 2.0888500E−03 | −4.9829717E−04 | −2.0851099E−03 |
| RA5 | −6.0998020E−04 | −3.7479974E−04 | 1.2280215E−04 | 7.7002748E−04 |
| RA6 | 1.7556422E−04 | 6.4412063E−05 | 8.6042905E−05 | −3.3813418E−05 |
| RA7 | −2.8809775E−05 | 1.4662583E−05 | −1.8449952E−05 | −3.8604711E−05 |
| RA8 | −1.2776605E−07 | −4.2093739E−07 | −9.8939927E−07 | 7.8046350E−07 |
| RA9 | 5.5496331E−07 | −6.3369868E−07 | −1.6917489E−07 | 9.3036441E−07 |
| RA10 | −7.1751615E−09 | −1.8019174E−08 | 9.1805310E−09 | 8.2650992E−09 |
| RA11 | −1.0151605E−08 | 5.9897772E−09 | 3.4082925E−09 | −9.0934860E−09 |
| RA12 | 7.4199750E−10 | 9.2005092E−10 | 1.0929858E−09 | −3.7721171E−10 |

| | Surface Number | | |
|---|---|---|---|
| | 6 | 8 | 9 |
| KA | −5.4012413 | −10.0000000 | −2.9559578 |
| RA3 | 4.0581539E−04 | 1.5993910E−04 | 9.6002711E−05 |
| RA4 | 3.8238210E−03 | −3.8040535E−03 | 4.4490487E−03 |
| RA5 | 8.4014951E−05 | 1.8994052E−03 | 6.3490152E−04 |
| RA6 | −2.1893976E−04 | 1.3481431E−04 | −1.6487750E−04 |
| RA7 | −3.4424136E−05 | −4.0237313E−05 | 7.4347882E−06 |
| RA8 | 1.4596220E−05 | −2.2254511E−05 | 6.4436512E−06 |
| RA9 | 7.3258615E−07 | 1.7881481E−06 | 4.4774375E−06 |
| RA10 | −4.3395220E−07 | 9.5453392E−07 | −1.2626079E−06 |

TABLE 31

Example 11: Basic Lens Data

| Si Surface Number | Ri (Radius of Curvature) | Di (Distance) | Ndj (Refractive Index) | vdj (Abbe's Number) |
|---|---|---|---|---|
| *1 | 291.3887 | 1.50 | 1.53389 | 56.0 |
| *2 | 5.6000 | 2.34 | | |
| 3 | 10.9544 | 1.88 | 1.60595 | 27.0 |
| *4 | 21.6343 | D4 | | |
| 5 | ∞ (Aperture Stop) | 0.40 | | |
| *6 | 6.2626 | 2.90 | 1.53389 | 56.0 |
| 7 | −11.4022 | 0.15 | | |
| *8 | −17.9967 | 1.48 | 1.60595 | 27.0 |
| *9 | 13.2556 | 3.63 | | |
| *10 | −11.0159 | 1.40 | 1.53389 | 56.0 |
| *11 | −8.4313 | D11 | | |
| 12 | ∞ | 0.80 | 1.51680 | 64.2 |
| 13 | ∞ | 9.60 | | |

*Aspherical Surface

TABLE 32

Example 11: Data related to Zoom

| Item | Wide Angle End | Telephoto End |
|---|---|---|
| f | 7.00 | 28.00 |
| Fno. | 4.22 | 7.79 |
| 2ω | 65.32 | 16.50 |
| D4 | 26.76 | 1.17 |
| D11 | 2.86 | 21.50 |

TABLE 33

Example 11 Aspherical Surface Coefficients

| | Surface Number | | | |
|---|---|---|---|---|
| | 1 | 2 | 4 | 6 |
| KA | 10.0000090 | 0.8237751 | −0.2442424 | −4.8759924 |
| RA3 | 2.7797989E−03 | 4.6199875E−04 | 4.9021538E−04 | −3.0445469E−04 |
| RA4 | −7.0927256E−04 | 2.0662827E−03 | −1.3875019E−03 | 3.9176131E−03 |
| RA5 | 1.5554406E−04 | −1.1090094E−03 | 6.0136043E−04 | −1.2132840E−03 |
| RA6 | 2.7664452E−05 | 4.0254109E−04 | −1.3060073E−04 | 2.7863100E−04 |
| RA7 | −1.5716891E−05 | −7.1966746E−05 | −1.5805307E−06 | 3.2988551E−05 |
| RA8 | −1.5930601E−06 | −2.3516701E−06 | 3.9790636E−06 | −8.8628231E−06 |
| RA9 | 7.3200338E−07 | 8.5409849E−07 | −2.1432287E−08 | −1.1309385E−05 |
| RA10 | 2.4344416E−08 | 7.0911798E−08 | −4.3636041E−08 | 2.7039231E−06 |
| RA11 | −1.7387413E−08 | 1.9258827E−08 | −1.2628192E−08 | |
| RA12 | 1.0707760E−09 | −4.6693910E−09 | 1.8612073E−09 | |

| | Surface Number | | | |
|---|---|---|---|---|
| | 8 | 9 | 10 | 11 |
| KA | 0.8342312 | −0.7976375 | −1.4390174 | −2.0031330 |
| RA3 | −4.4806395E−04 | −6.6226672E−04 | 1.1041831E−03 | 1.9031572E−03 |
| RA4 | 1.3016736E−05 | 2.0516362E−03 | −8.4111592E−04 | −1.5724317E−03 |
| RA5 | 1.0097790E−03 | 5.0188737E−04 | 9.3655620E−05 | 2.0688653E−04 |
| RA6 | −4.2265893E−04 | −4.9277472E−04 | −1.8539442E−05 | −8.4212052E−06 |
| RA7 | −1.3097307E−04 | −4.9804775E−05 | −2.3775369E−05 | −2.0380310E−05 |
| RA8 | 1.2659375E−05 | 2.7058725E−05 | −1.0942142E−05 | −4.9039870E−06 |
| RA9 | 3.8618766E−05 | 1.8822019E−05 | −2.0196156E−06 | 1.6041111E−06 |
| RA10 | −7.8285013E−06 | −2.3384312E−06 | 4.8954146E−06 | 1.4746402E−06 |

Table 34 shows values corresponding to Conditional Formulae (1) through (17) of the zoom lenses of Examples 1 through 11. The values in Table 34 are related to the d line.

TABLE 34

Values Related to Conditional Formulae

| | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| (1) |f1|/fw | 1.97 | 1.71 | 2.19 | 1.81 | 2.32 | 2.09 | 2.40 | 2.20 | 2.09 | 2.11 | 2.34 |
| (2) f2/fw | 1.93 | 1.74 | 1.91 | 1.76 | 2.07 | 1.76 | 2.06 | 1.92 | 1.87 | 1.65 | 2.08 |
| (3) d2/fw | 0.37 | 0.45 | 0.35 | 0.44 | 0.39 | 0.51 | 0.43 | 0.35 | 0.36 | 0.35 | 0.33 |
| (4) ft/fw | 2.83 | 2.83 | 2.83 | 2.83 | 3.77 | 2.83 | 2.83 | 2.83 | 2.83 | 2.83 | 4.00 |
| (5) nd2 | 1.63 | 1.63 | 1.63 | 1.63 | 1.63 | 1.63 | 1.63 | 1.58 | 1.63 | 1.63 | 1.61 |
| (6) νd2 | 23.6 | 23.6 | 23.6 | 23.6 | 23.6 | 23.6 | 23.6 | 30.2 | 23.6 | 23.6 | 27.0 |
| (7) nd1 | 1.53 | 1.53 | 1.49 | 1.53 | 1.53 | 1.60 | 1.53 | 1.53 | 1.53 | 1.53 | 1.53 |
| (8) νd1 | 56.0 | 56.0 | 57.5 | 56.0 | 56.0 | 67.7 | 56.0 | 56.0 | 56.0 | 56.0 | 56.0 |
| (9) TLw/fw | 7.04 | 6.15 | 7.07 | 6.32 | 7.93 | 6.54 | 7.91 | 7.10 | 6.94 | 6.04 | 7.96 |
| (10) D1/fw | 0.88 | 0.82 | 0.74 | 0.82 | 0.86 | 1.01 | 0.89 | 0.91 | 0.86 | 0.75 | 0.82 |
| (11) nd3 | 1.53 | 1.53 | 1.49 | 1.53 | 1.53 | 1.60 | 1.53 | 1.53 | 1.53 | — | 1.53 |
| (12) νd 3 | 56.0 | 56.0 | 57.5 | 56.0 | 56.0 | 67.7 | 56.0 | 56.0 | 56.0 | — | 56.0 |
| (13) nd4 | 1.63 | 1.63 | 1.63 | 1.63 | 1.63 | 1.67 | 1.63 | 1.63 | 1.58 | — | 1.61 |
| (14) νd4 | 23.6 | 23.6 | 23.6 | 23.6 | 23.6 | 32.1 | 23.6 | 23.6 | 30.2 | — | 27.0 |
| (15) nd5 | 1.53 | 1.53 | 1.49 | 1.53 | 1.53 | 1.53 | 1.53 | 1.59 | 1.53 | — | 1.53 |
| (16) νd5 | 56.0 | 56.0 | 57.5 | 56.0 | 56.0 | 56.0 | 56.0 | 61.1 | 56.0 | — | 56.0 |
| (17) αw | 9.31 | 9.77 | 9.49 | 9.60 | 9.97 | 11.75 | 11.24 | 9.80 | 9.73 | 12.67 | 9.84 |

The spherical aberration, the astigmatic aberration, the distortion, and the lateral chromatic aberration of the zoom lens of Example 1 at the wide angle end are illustrated in A through D of FIG. 12, respectively. The spherical aberration, the astigmatic aberration, the distortion, and the lateral chromatic aberration of the zoom lens of Example 1 at the telephoto end are illustrated in E through H of FIG. 12, respectively.

Each of the diagrams that illustrate the aberrations use the d line (wavelength: 587.6 nm) as a standard. However, in the diagrams that illustrate spherical aberration, aberrations related to wavelengths of 460.0 nm and 615.0 nm are also shown. In addition, the diagrams that illustrate lateral chromatic aberration also show aberrations related to wavelengths of 460.0 nm and 615.0 nm. In the diagrams that illustrate astigmatic aberrations, aberrations in the sagittal direction are indicated by solid lines, while aberrations in the tangential direction are indicated by broken lines. In the diagrams that illustrate spherical aberrations, "Fno." denotes F values. In the other diagrams that illustrate the aberrations, ω denotes half angles of view.

Figure 13:
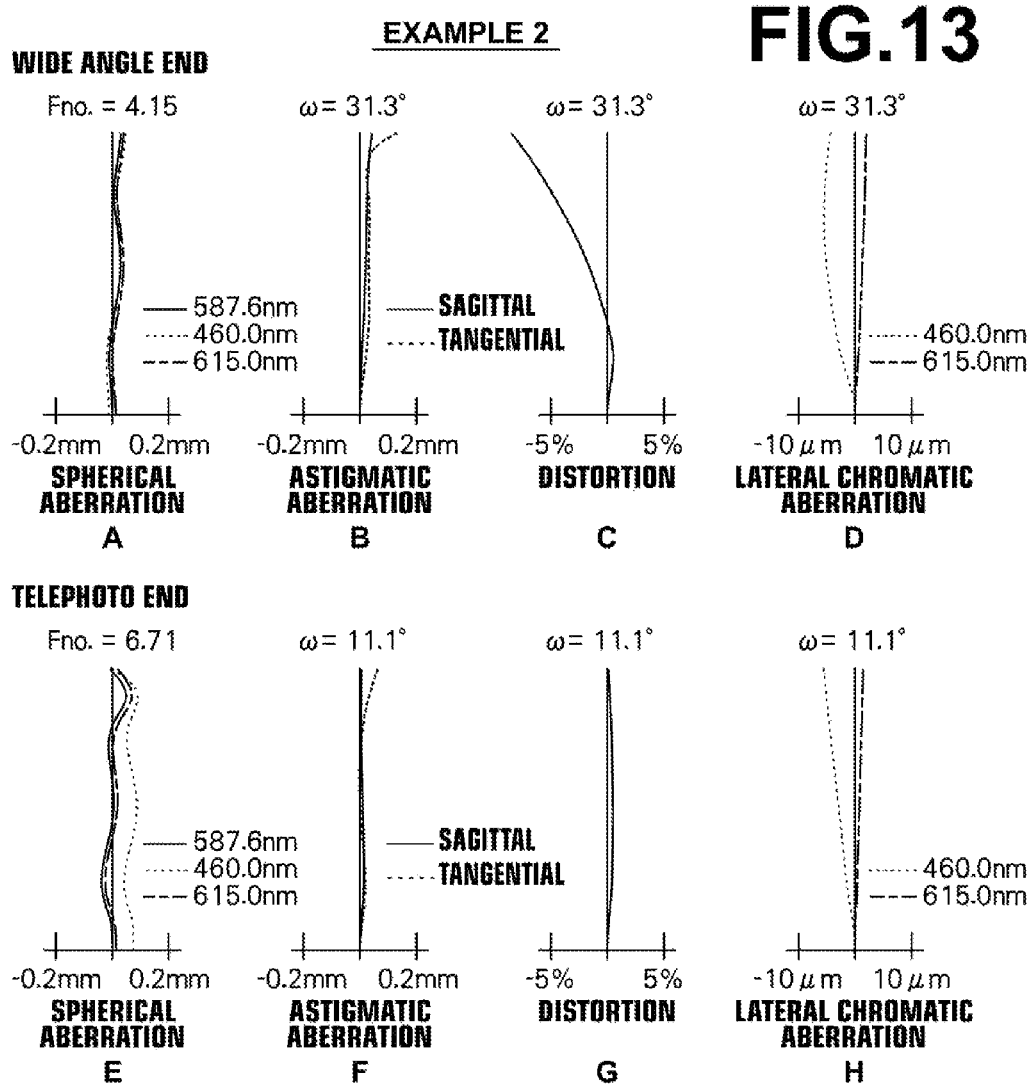
FIG. 13 A through H are graphs that illustrate various aberrations of the zoom lens of the second embodiment.
Figure 14:
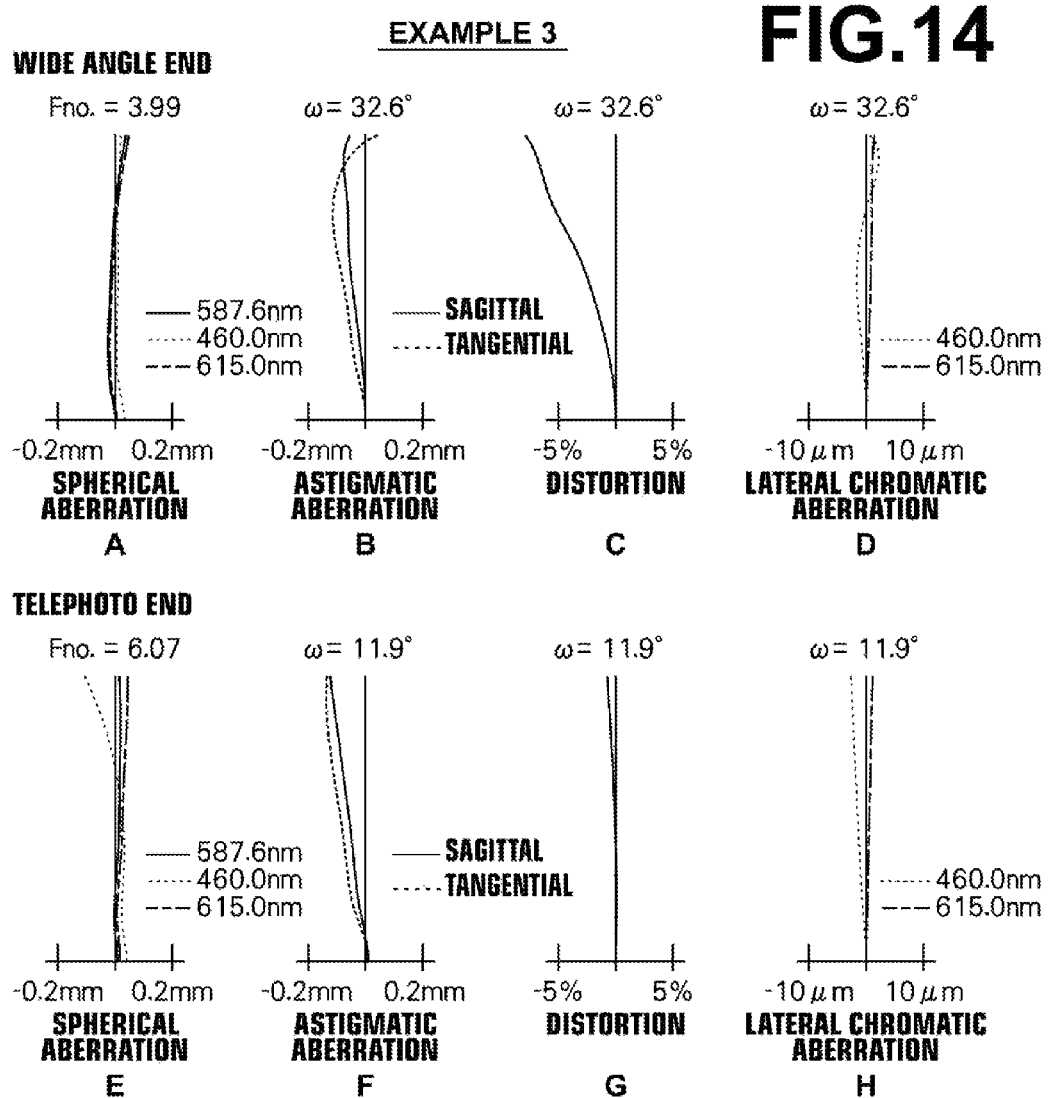
FIG. 14 A through H are graphs that illustrate various aberrations of the zoom lens of the third embodiment.
Figure 15:
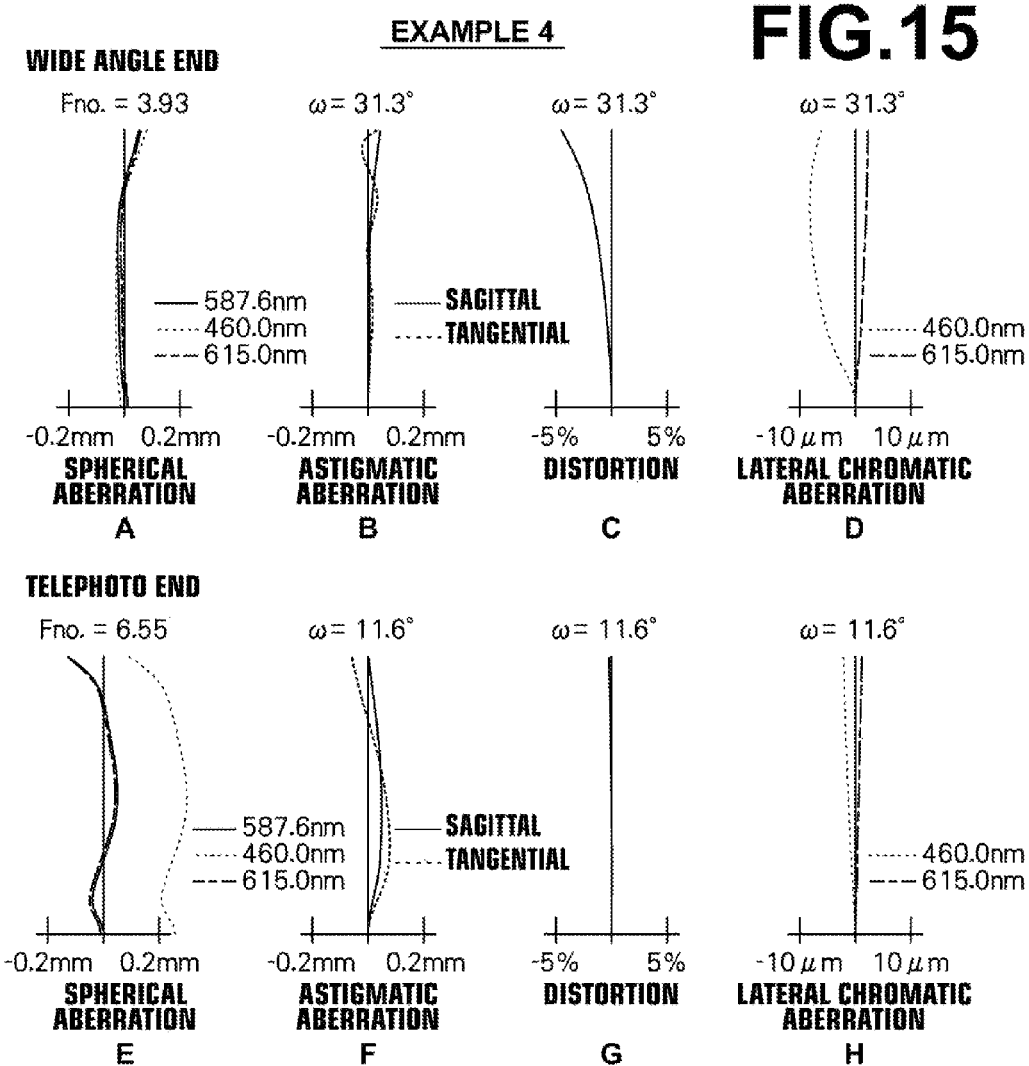
FIG. 15 A through H are graphs that illustrate various aberrations of the zoom lens of the fourth embodiment.
Figure 16:
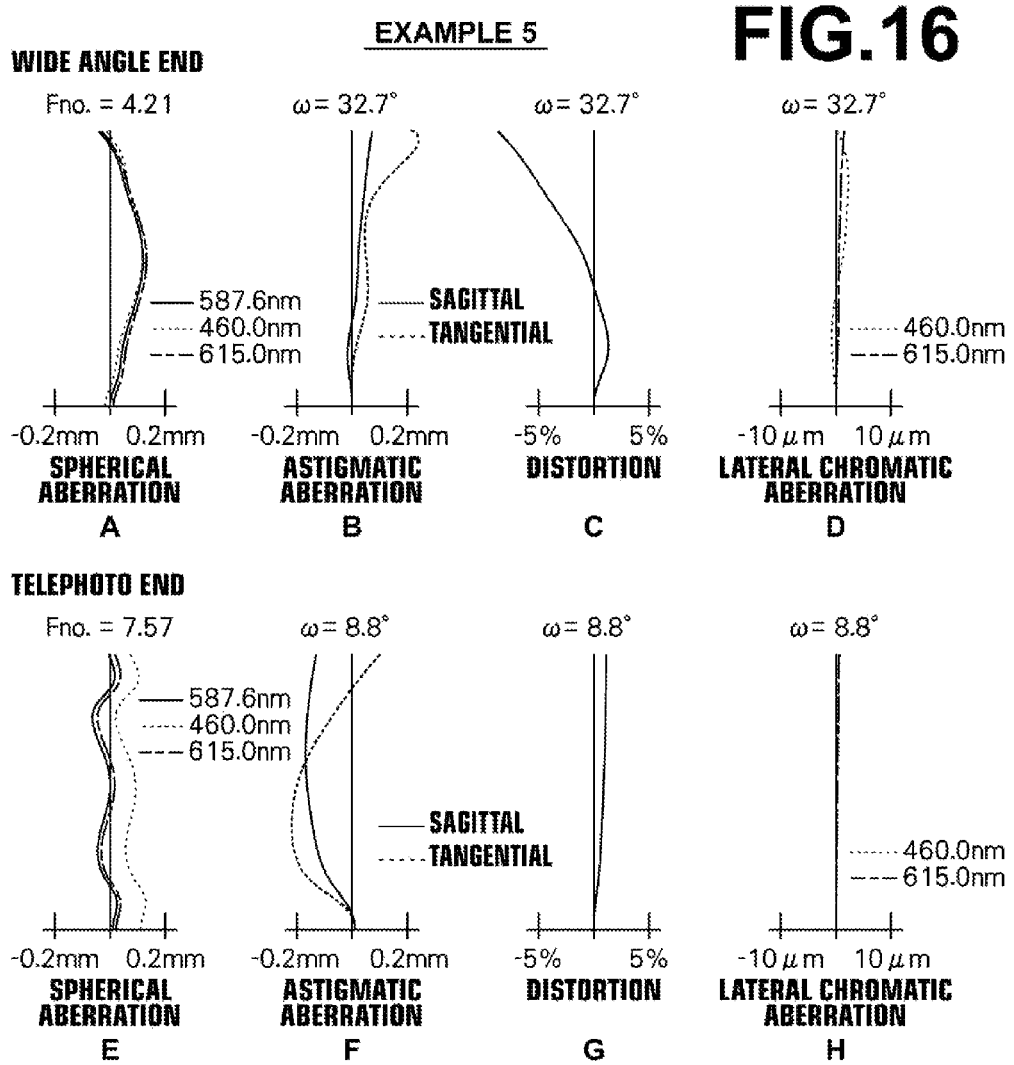
FIG. 16 A through H are graphs that illustrate various aberrations of the zoom lens of the fifth embodiment.
Figure 17:
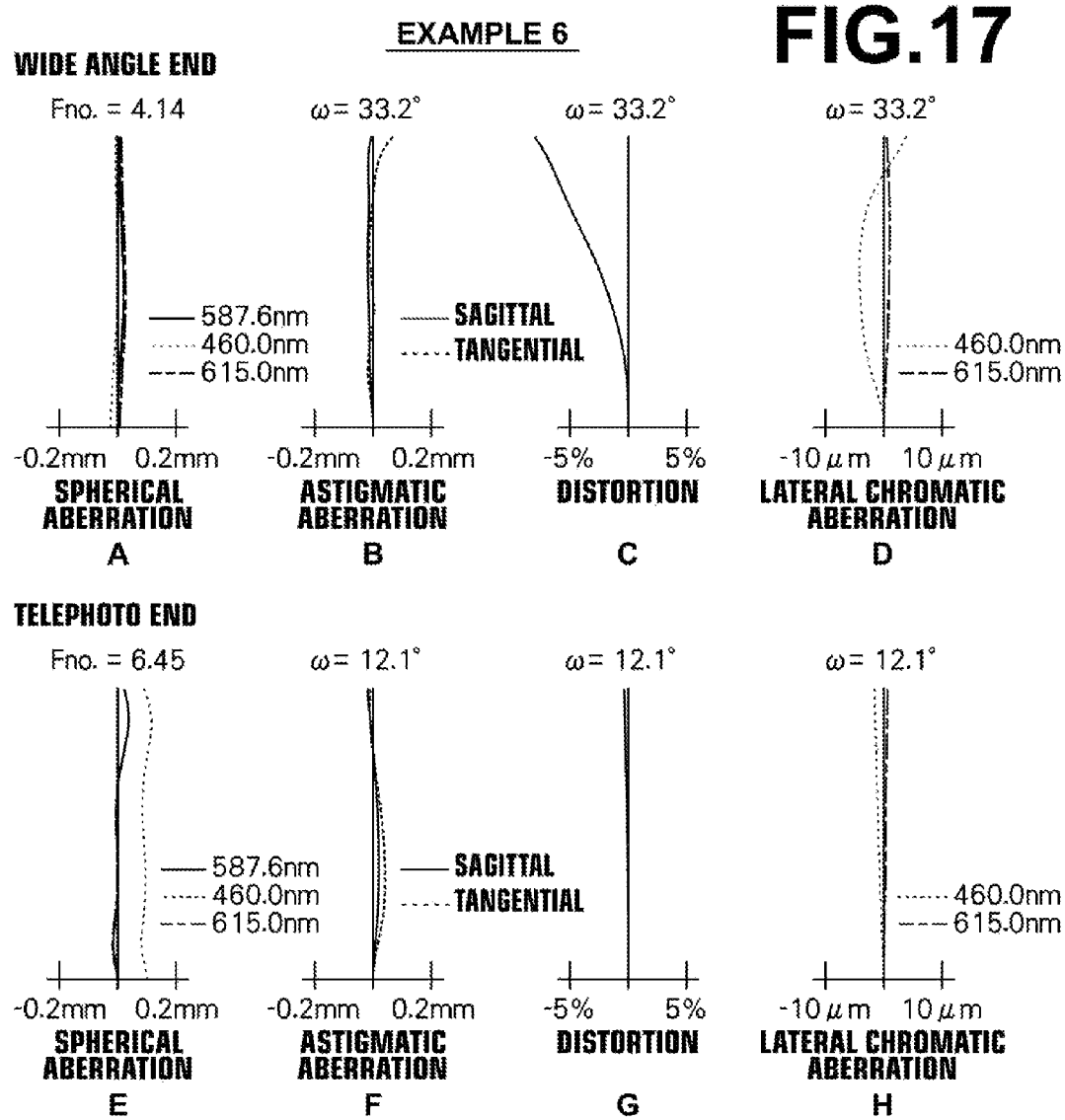
FIG. 17 A through H are graphs that illustrate various aberrations of the zoom lens of the sixth embodiment.
Figure 18:
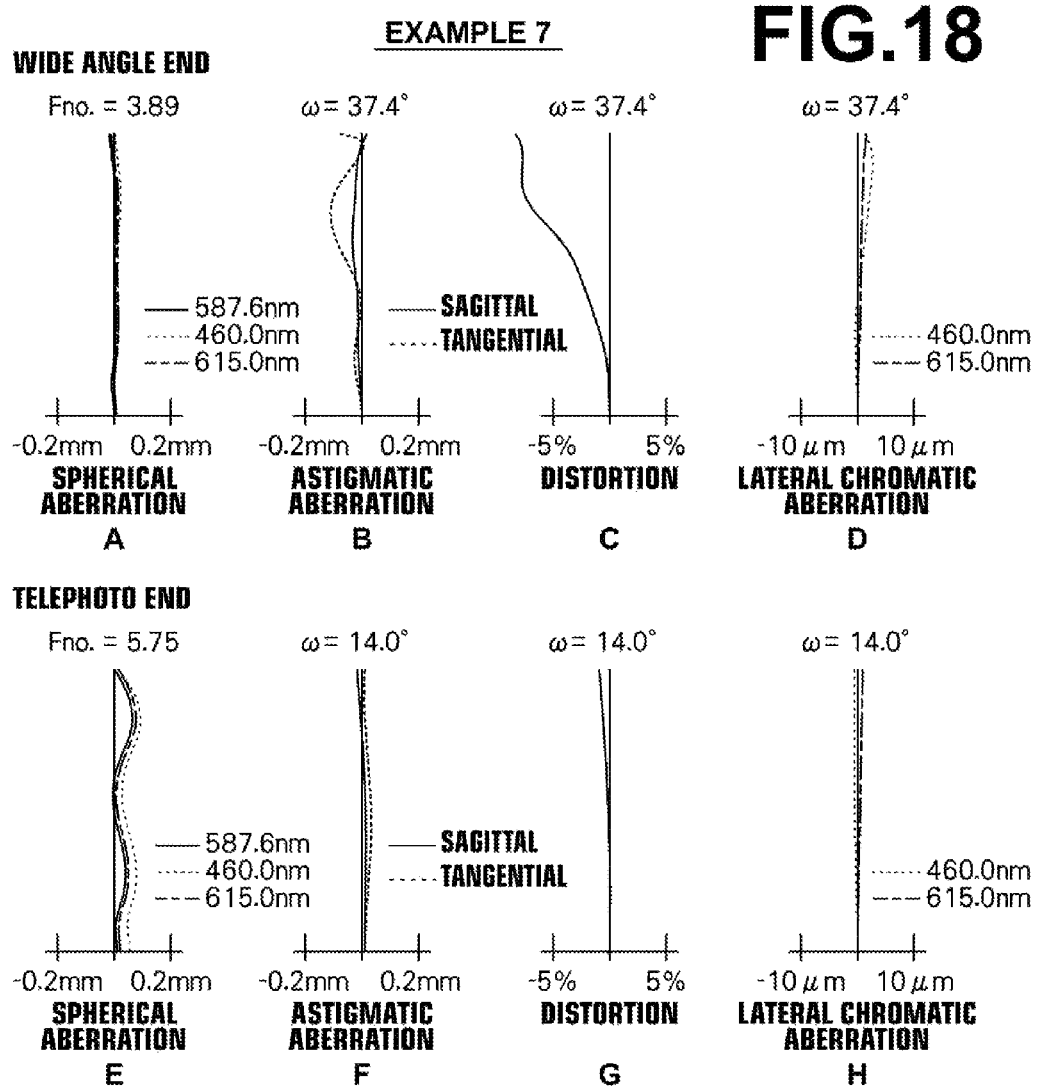
FIG. 18 A through H are graphs that illustrate various aberrations of the zoom lens of the seventh embodiment.
Figure 19:
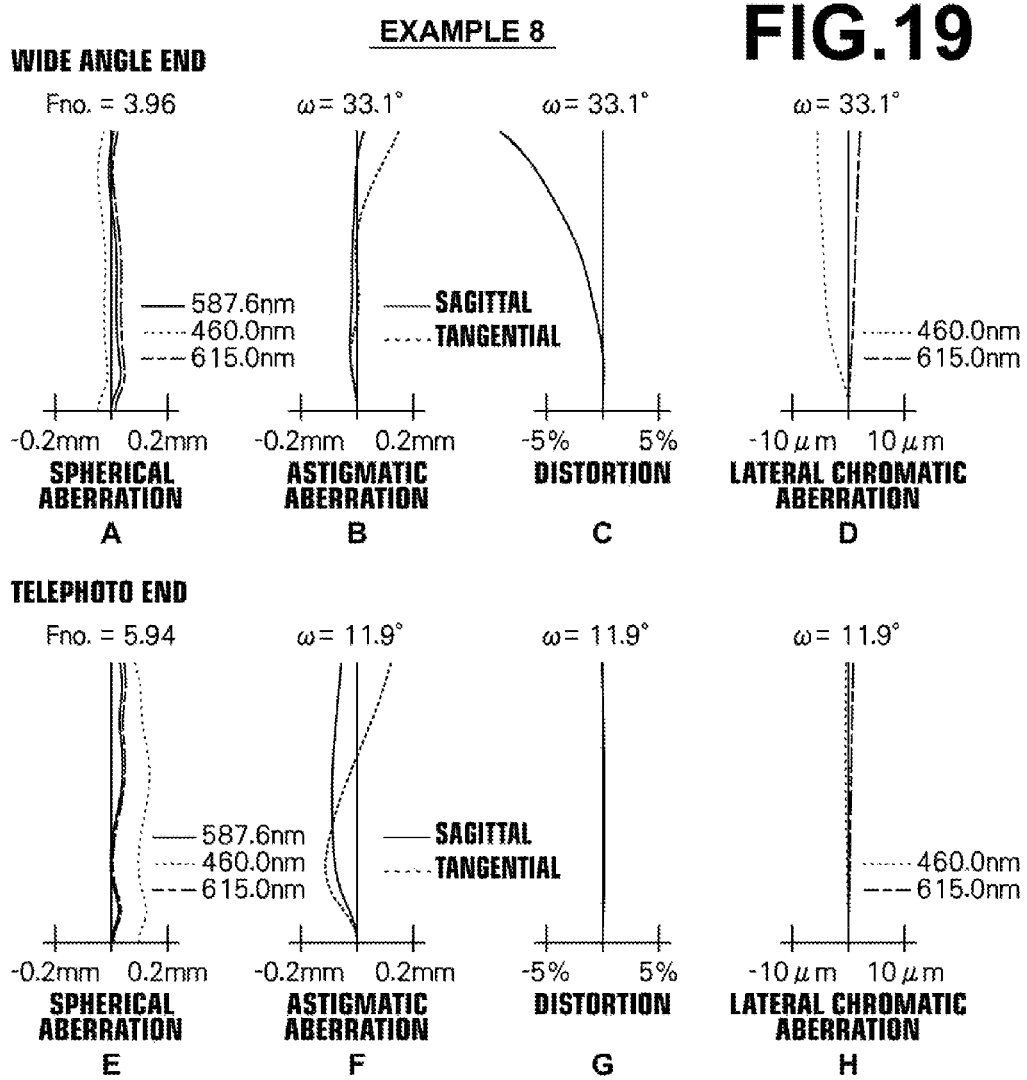
FIG. 19 A through H are graphs that illustrate various aberrations of the zoom lens of the eighth embodiment.
Figure 20:
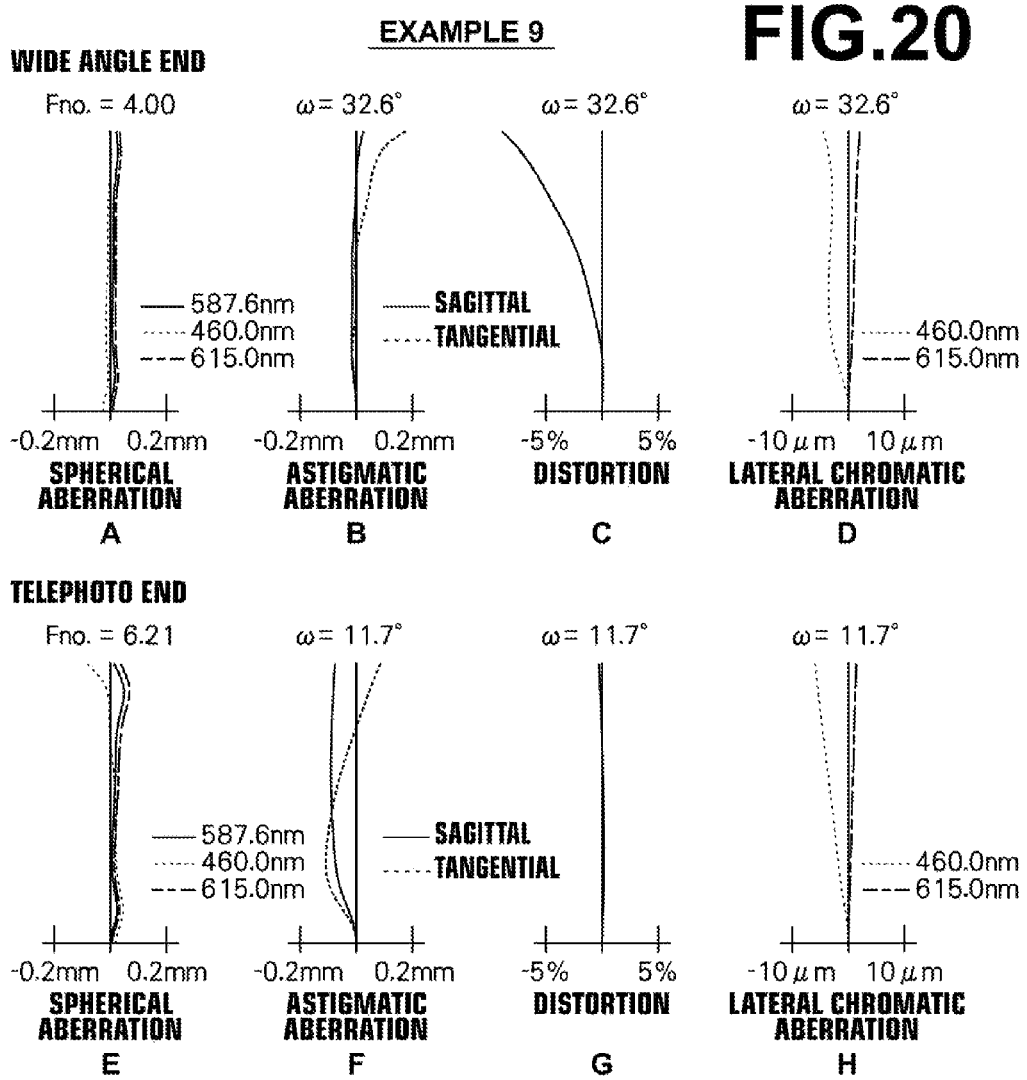
FIG. 20 A through H are graphs that illustrate various aberrations of the zoom lens of the ninth embodiment.
Figure 21:
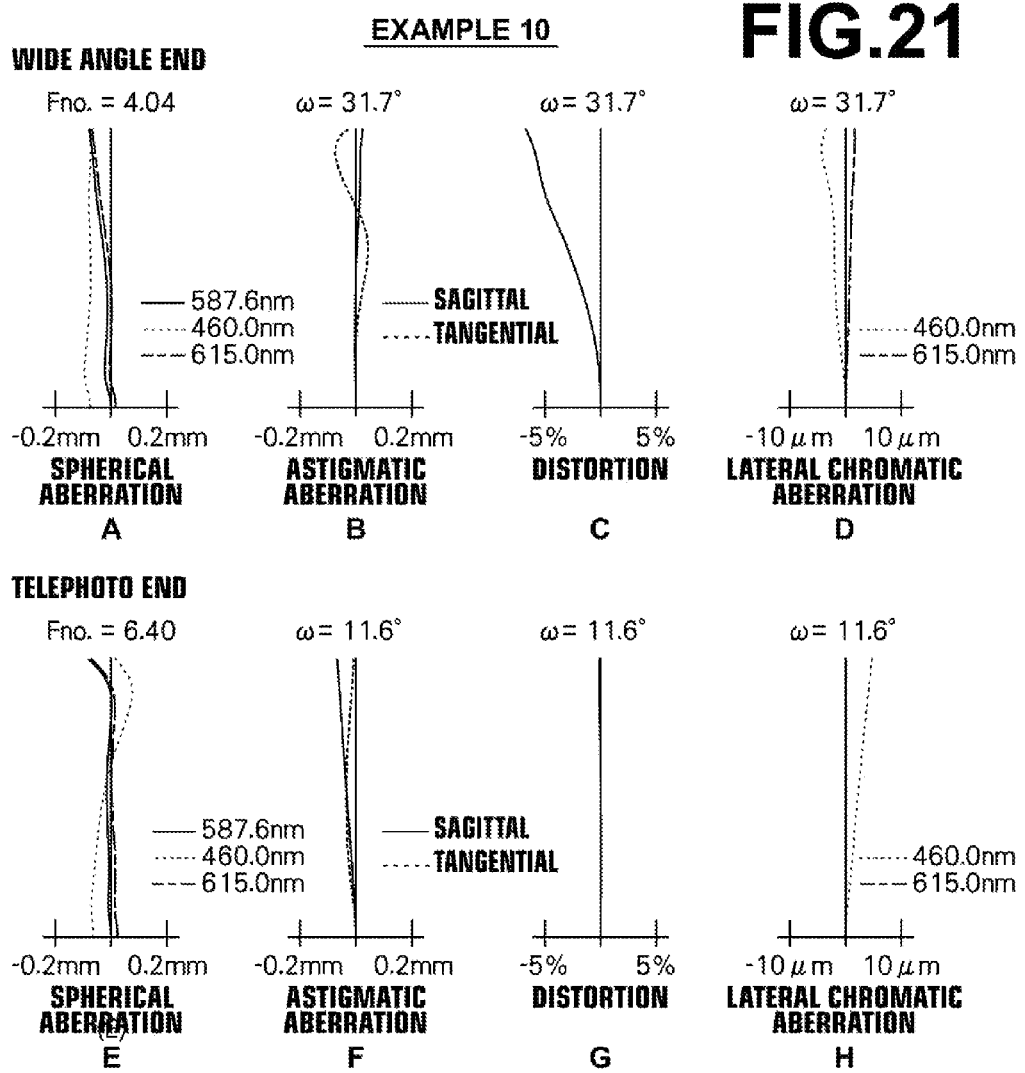
FIG. 21 A through H are graphs that illustrate various aberrations of the zoom lens of the tenth embodiment.
Figure 22:
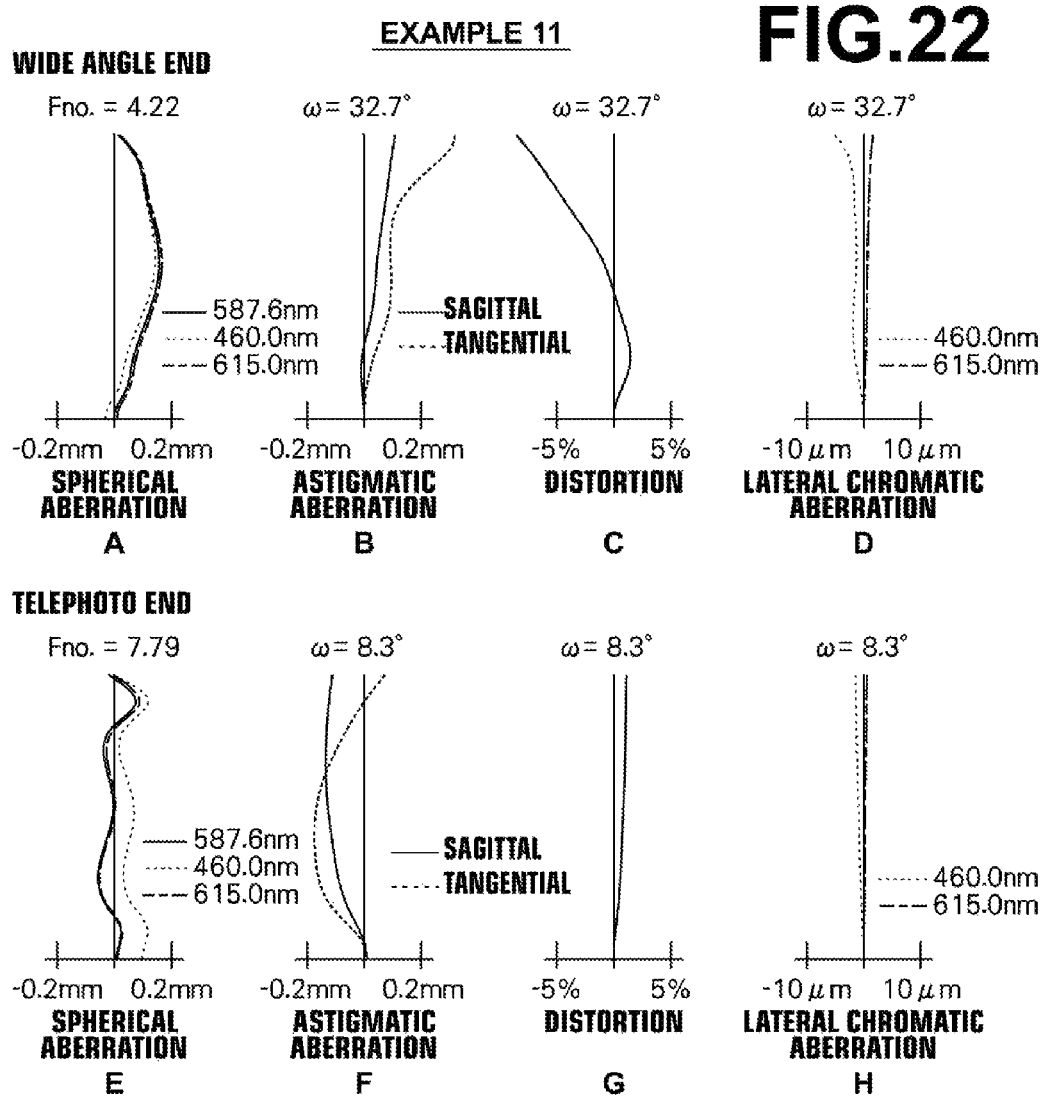
FIG. 22 A through H are graphs that illustrate various aberrations of the zoom lens of the eleventh embodiment.

Similarly, the aberrations of the zoom lens of Example 2 are illustrated in Figure A through H of FIG. 13. In addition, the aberrations of the zoom lenses of Examples 3 through 11 are illustrated in FIG. 14 through FIG. 22.

Figure 23:
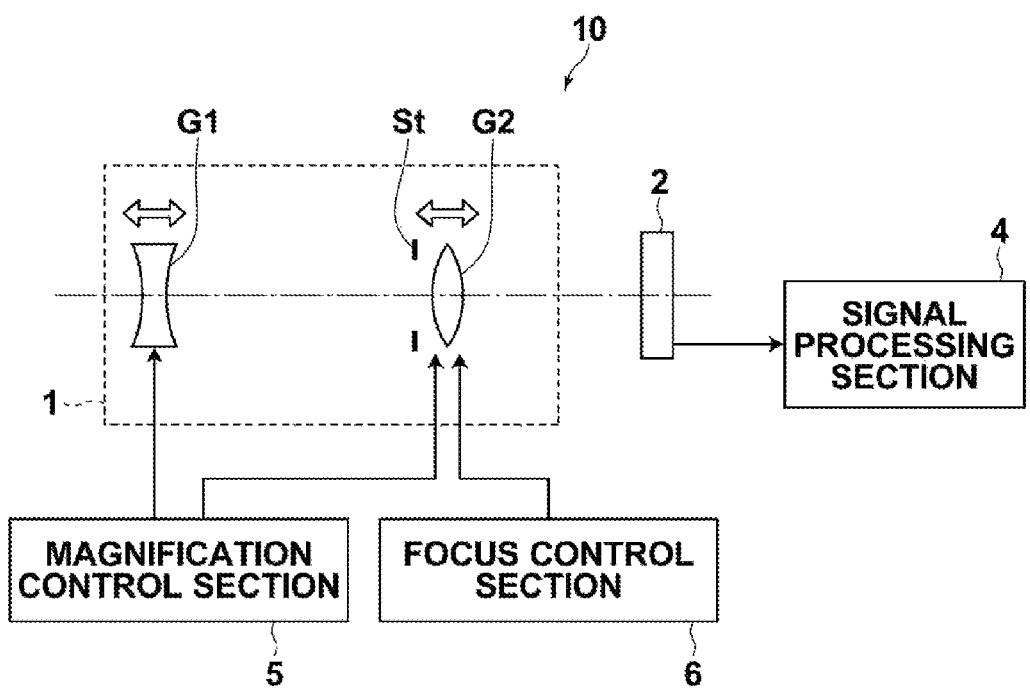
FIG. 23 is a diagram that schematically illustrates an imaging apparatus according to an embodiment of the present invention.

Next, an imaging apparatus according to an embodiment of the present invention will be described. FIG. 23 is a diagram that schematically illustrates an imaging apparatus 10 according to the embodiment of the present invention that employs the zoom lens 1 of the embodiment of the present invention. The imaging apparatus may be a surveillance camera, a video camera, an electronic still camera, or the like.

The imaging apparatus 10 illustrated in FIG. 23 is equipped with: the zoom lens 1; an imaging element 2 that captures images of subjects focused by the zoom lens 1, provided toward the image side of the zoom lens 1; a signal processing section 4 that processes signals output from the imaging element 2; a magnification control section 5 that changes the magnification of the zoom lens 1; and a focus control section 6 that performs focus adjustments. Note that various filters and the like may be provided between the zoom lens 1 and the imaging element 2 as appropriate.

The zoom lens 1 has the first lens group G1 having a negative refractive power that moves along a trajectory which is convex toward the image side when changing magnification from the wide angle end to the telephoto end, the second lens group G2 having a positive refractive power that moves monotonously toward the object side when changing magnification from the wide angle end to the telephoto end, and the aperture stop St configured to move integrally with the second lens group G2. Note that the lens groups are schematically illustrated in FIG. 23.

The imaging element 2 captures an optical image formed by the zoom lens 1 and outputs electrical signals. The imaging surface thereof is provided to match the imaging plane of the zoom lens 1. A CCD, a CMOS, or the like may be employed as the imaging element 2.

Note that although not illustrated in FIG. 23, the imaging apparatus 10 may be further equipped with a blur correcting mechanism that moves a lens having a positive refractive power that constitutes a portion of the second lens group G2 in a direction perpendicular to the optical axis Z in order to correct blurring of obtained images due to vibration or shaky hands.

The present invention has been described with reference to the embodiments and Examples thereof. However, the present invention is not limited to the embodiments and Examples described above, and various modifications are possible. For example, the values of the radii of curvature, the distances among surfaces, the refractive indices, the Abbe's numbers, the aspherical surface coefficients, etc., are not limited to the numerical values indicated in connection with the Examples, and may be other values.

What is claimed is:

1. A zoom lens, practically comprising:

a first lens group having a negative refractive power; and a second lens group having a positive refractive power, provided in this order from an object side;

the first lens group moving along a trajectory which is convex toward an image side, the second lens group moving monotonously toward the object side, and an aperture stop moving integrally with the second lens group when changing magnification from a wide angle end to a telephoto end;

the first lens group comprising two lenses, a first lens having a negative refractive power and a second lens having a positive refractive power;

at least one of the two lenses of the first lens group being a plastic lens;

the second lens group comprising three or fewer lenses, of which at least one is a plastic lens; and the zoom lens satisfying the following conditional formulae:

$$1.6 < |f1|/fw < 2.5 \quad (1)$$

$$1.6 < f2/fw < 2.4 \quad (2)$$

$$0.32 < d2/fw < 0.60 \quad (3)$$

$$2.5 < ft/fw < 4.5 \quad (4)$$

$$1.56 < nd2 < 1.66 \quad (5)$$

$$vd2 < 33 \quad (6)$$

wherein f1 is the focal length of the first lens group, f2 is the focal length of the second lens group, fw is the focal length of the entire system at the wide angle end, d2 is the distance between the first lens and the second lens along an optical axis, ft is the focal length of the entire system at the telephoto end, nd2 is the refractive index of the second lens with respect to the d line, and vd2 is the Abbe's number of the second lens with respect to the d line.

2. A zoom lens as defined in claim 1, that satisfies at least one of the following conditional formulae:

$$1.7 < f2/fw < 2.3 \quad (2')$$

$$0.32 < d2/fw < 0.55 \quad (3')$$

$$2.7 < ft/fw < 4.5 \quad (4')$$

$$1.56 < nd2 < 1.65 \quad (5')$$

$$vd2 < 29 \quad (6').$$

3. A zoom lens as defined in claim 2, wherein:
the surface of the first lens of the first lens group toward the object side is concave in a paraxial region.

4. A zoom lens as defined in claim 1, that satisfies the following conditional formulae:

$$1.48 < nd1 < 1.61 \quad (7)$$

$$vd1 > 50 \quad (8)$$

wherein nd1 is the refractive index of the first lens with respect to the d line, and vd1 is the Abbe's number of the first lens with respect to the d line.

5. A zoom lens as defined in claim 4 that satisfies the following conditional formula:

$$vd1 > 52 \quad (8').$$

6. A zoom lens as defined in claim 5, wherein:
the surface of the first lens of the first lens group toward the object side is concave in a paraxial region.

7. A zoom lens as defined in claim 4, wherein:
the surface of the first lens of the first lens group toward the object side is concave in a paraxial region.

8. A zoom lens as defined in claim 1, that satisfies the following conditional formula:

$$5.8 < TLw/fw < 8.4 \quad (9)$$

wherein TLw is the distance from the surface of the first lens toward the object side to an imaging surface along the optical axis at the wide angle end, and fw is the focal length of the entire system at the wide angle end.

9. A zoom lens as defined in claim 8 that satisfies the following conditional formula:

$$6.0 < TLw/fw < 8.2 \quad (9').$$

10. A zoom lens as defined in claim 1, wherein:
the first lens is a plastic lens.

11. A zoom lens as defined in claim 1, wherein:
the second lens group comprises a third lens having a positive refractive power, a fourth lens having a negative refractive power, and a fifth lens having a positive refractive power, in this order from the object side.

12. A zoom lens as defined in claim 1, wherein:
all of the lenses of the second lens group are plastic lenses.

13. A zoom lens as defined in claim 1 that satisfies the following conditional formula:

$$0.7 < D1/fw < 1.2 \quad (10)$$

wherein D1 is the distance from the surface of the first lens toward the object side to the surface of the first lens toward the image side, and fw is the focal length of the entire system at the wide angle end.

14. A zoom lens as defined in claim 1, wherein:
the surface of the first lens of the first lens group toward the object side is concave in a paraxial region.

15. An imaging apparatus comprising a zoom lens as defined in claim 1.

16. A zoom lens as defined in claim 1, wherein:
the second lens is a plastic lens.

17. A zoom lens, practically comprising:
a first lens group having a negative refractive power; and
a second lens group having a positive refractive power, provided in this order from an object side;
the first lens group moving along a trajectory which is convex toward an image side, the second lens group moving monotonously toward the object side, and an aperture stop moving integrally with the second lens group when changing magnification from a wide angle end to a telephoto end;
the first lens group comprising two lenses, a first lens having a negative refractive power and a concave surface that faces the object side at the paraxial region, and a second lens having a positive refractive power;
at least one of the two lenses of the first lens group being a plastic lens;
the second lens group comprising three or fewer lenses, of which at least one is a plastic lens; and
the zoom lens satisfying the following conditional formulae:

$$1.6 < |f1|/fw < 2.5 \quad (1)$$

$$1.6 < f2/fw < 2.4 \quad (2)$$

$$0.32 < d2/fw < 0.60 \quad (3)$$

$$2.5 < ft/fw < 4.5 \quad (4)$$

$$1.48 < nd1 < 1.61 \quad (7)$$

$$vd1 > 50 \quad (8)$$

wherein f1 is the focal length of the first lens group, f2 is the focal length of the second lens group, fw is the focal length of the entire system at the wide angle end, d2 is the distance between the first lens and the second lens along an optical axis, ft is the focal length of the entire system at the telephoto end, nd1 is the refractive index of the first lens with respect to the d line, and vd1 is the Abbe's number of the first lens with respect to the d line.

18. A zoom lens as defined in claim 17, that satisfies at least one of the following conditional formulae:

$$1.7 < f2/fw < 2.3 \quad (2')$$

$$0.32 < d2/fw < 0.55 \quad (3')$$

$$2.7 < ft/fw < 4.5 \quad (4')$$

$$vd1 > 52 \quad (8').$$

19. An imaging apparatus comprising a zoom lens as defined in claim 17.

20. A zoom lens as defined in claim 17, wherein:
the surface of the first lens of the first lens group toward the object side is concave in a paraxial region.

* * * * *